(12) United States Patent
Gibson et al.

(10) Patent No.: US 10,001,546 B2
(45) Date of Patent: Jun. 19, 2018

(54) APPARATUS FOR MONITORING AIRCRAFT POSITION

(71) Applicant: SITA Information Networking Computing UK Limited, Hayes (GB)

(72) Inventors: Paul Gibson, Hayes (GB); Yanik Lacroix, Montreal (CA); Benoit Jean Joseph Vachon, Montreal (CA)

(73) Assignee: SITA INFORMATION NETWORKING COMPUTING UK LIMITED, Hayes (GB)

( * ) Notice: Subject to any disclaimer, the term of this patent is extended or adjusted under 35 U.S.C. 154(b) by 0 days. days.

(21) Appl. No.: 14/558,063

(22) Filed: Dec. 2, 2014

(65) Prior Publication Data

US 2016/0155342 A1    Jun. 2, 2016

(51) Int. Cl.
| | | |
|---|---|---|
| G01S 5/00 | (2006.01) | |
| G01S 5/02 | (2010.01) | |
| G08G 5/00 | (2006.01) | |

(52) U.S. Cl.
CPC .......... *G01S 5/0294* (2013.01); *G01S 5/0054* (2013.01); *G08G 5/0013* (2013.01);
(Continued)

(58) Field of Classification Search
CPC .................................................... G01S 5/0294
(Continued)

(56) References Cited

U.S. PATENT DOCUMENTS 4,821,118 A    4/1989 Lafreniere
5,270,921 A    12/1993 Hornick
(Continued)

FOREIGN PATENT DOCUMENTS

CN    101436185 A    5/2009
DE    10357831 A1    7/2005
(Continued)

OTHER PUBLICATIONS

Technology-enabled airborne spacing and merging; Hull, J.; Barmore, B.; Abbott, T.; Digital Avionics Systems Conference, 2004. DASC 04. The 23rd; Year: 2004, vol. 1; pp. 2.B.4-2.1-9 vol. 1, DOI: 10.1109/DASC.2004.1391265.*
(Continued)

*Primary Examiner* — Cuong H Nguyen
(74) *Attorney, Agent, or Firm* — Morris, Manning & Martin, LLP; Daniel E. Sineway, Esq.; R. Lee Strasburger, Jr., Esq.

(57) ABSTRACT

An apparatus and computerized method are provided for monitoring the positions of one or more aircraft. The apparatus comprises a first receiver configured to receive first aircraft position information, over a digital data link, from a first radio frequency source located onboard the aircraft at a first period, via one or more ground stations and a second receiver configured to receive second aircraft position information broadcasted from a second radio frequency source located onboard the aircraft at a second period, via one or more ground stations. The apparatus additionally comprises a third receiver configured to receive electronic geographical mapping data and a processor configured to receive the first and second aircraft position information, to filter the quantity of first and second aircraft position information to smooth the filtered information and then output the smoothed information such that it can be overlaid onto the electronic geographical mapping data.

33 Claims, 12 Drawing Sheets

(52) U.S. Cl.
CPC ......... *G08G 5/0021* (2013.01); *G08G 5/0026* (2013.01); *G08G 5/0078* (2013.01); *G08G 5/0082* (2013.01); *G08G 5/0091* (2013.01)

(58) Field of Classification Search
USPC ................ 701/409, 2, 120–122, 528, 117
See application file for complete search history.

(56) References Cited

U.S. PATENT DOCUMENTS

| | | |
|---|---|---|
| 5,748,850 A | 5/1998 | Sakurai |
| 5,793,639 A | 8/1998 | Yamazaki |
| 5,897,620 A | 4/1999 | Walker |
| 5,918,209 A | 6/1999 | Campbell et al. |
| 6,044,353 A | 3/2000 | Pugliese, III |
| 6,108,636 A | 8/2000 | Yap et al. |
| 6,112,185 A | 8/2000 | Walker et al. |
| 6,158,658 A | 12/2000 | Barclay |
| 6,192,416 B1 | 2/2001 | Baxter |
| 6,259,405 B1 | 7/2001 | Stewart |
| 6,367,016 B1 | 4/2002 | Lambert et al. |
| 6,384,783 B1 | 5/2002 | Smith et al. |
| 6,414,635 B1 | 7/2002 | Stewart |
| 6,473,704 B1 | 10/2002 | Ito et al. |
| 6,553,336 B1 | 4/2003 | Johnson |
| 6,661,340 B1 | 12/2003 | Saylor et al. |
| 6,695,203 B2 | 2/2004 | Iki et al. |
| 6,735,630 B1 | 5/2004 | Gelvin |
| 6,736,322 B2 | 5/2004 | Gobburu |
| 6,758,394 B2 | 7/2004 | Maskatiya |
| 6,760,778 B1 | 7/2004 | Nelson et al. |
| 6,869,023 B2 | 3/2005 | Hawes et al. |
| 6,972,682 B2 | 12/2005 | Lareau |
| 7,027,808 B2 | 4/2006 | Wesby |
| 7,035,828 B2 | 4/2006 | Ketonen et al. |
| 7,212,978 B2 | 5/2007 | Kowal et al. |
| 7,258,276 B2 | 8/2007 | Linton et al. |
| 7,275,689 B2 | 10/2007 | Mak |
| 7,327,262 B2 | 2/2008 | Motteram et al. |
| 7,421,319 B2 | 9/2008 | Stefani |
| 7,440,967 B2 | 10/2008 | Chidlovskii |
| 7,454,203 B2 | 11/2008 | Levitan |
| 7,483,696 B1 | 1/2009 | Mitchell |
| 7,486,171 B2 | 2/2009 | Kim |
| 7,486,960 B2 | 2/2009 | Brady, Jr. et al. |
| 7,539,985 B2 | 5/2009 | Marvin |
| 7,570,214 B2* | 8/2009 | Smith ................ G01S 5/0027 342/451 |
| 7,571,206 B2 | 8/2009 | Koning et al. |
| 7,599,847 B2 | 10/2009 | Block |
| 7,607,080 B2 | 10/2009 | Heuer et al. |
| 7,664,672 B1 | 2/2010 | Walker et al. |
| 7,667,647 B2* | 2/2010 | Breen ................ G01S 5/0221 342/450 |
| 7,668,873 B2 | 2/2010 | Davis et al. |
| 7,685,009 B2 | 3/2010 | Halavais et al. |
| 7,702,328 B2 | 4/2010 | Lemond et al. |
| 7,720,724 B2 | 5/2010 | Kurashige |
| 7,739,292 B2 | 6/2010 | Falk et al. |
| 7,786,899 B2 | 8/2010 | Baker et al. |
| 7,805,523 B2 | 9/2010 | Mitchell et al. |
| 7,870,101 B2 | 1/2011 | Hubbard et al. |
| 7,882,137 B2 | 2/2011 | Lepman |
| 7,907,067 B2 | 3/2011 | Baker et al. |
| 7,907,545 B2 | 3/2011 | Ric |
| 7,949,335 B2 | 5/2011 | Stefani et al. |
| 7,954,712 B2 | 6/2011 | Babcock et al. |
| 8,001,519 B2 | 8/2011 | Conallen et al. |
| 8,058,972 B2 | 11/2011 | Mohanty |
| 8,072,382 B2* | 12/2011 | Smith ................ G01S 5/0027 342/357.31 |
| 8,087,583 B2 | 1/2012 | Hawes |
| 8,090,603 B2 | 1/2012 | Payne et al. |
| 8,117,051 B2 | 2/2012 | Sauvage et al. |
| 8,160,759 B2 | 4/2012 | Baker et al. |
| 8,165,809 B1 | 4/2012 | Baker et al. |
| 8,170,535 B1 | 5/2012 | Lopes et al. |
| 8,195,151 B2 | 6/2012 | Cerra, II et al. |
| 8,214,144 B2 | 7/2012 | Baker et al. |
| 8,229,458 B2 | 7/2012 | Busch |
| 8,296,281 B2 | 10/2012 | Baker et al. |
| 8,332,136 B2 | 11/2012 | Baker et al. |
| 8,467,726 B2 | 6/2013 | Shirakata |
| 8,509,441 B2 | 8/2013 | Yoon |
| 8,521,681 B2 | 8/2013 | Ouchi |
| 8,606,508 B2 | 12/2013 | Baker et al. |
| 8,631,358 B2 | 1/2014 | Louch |
| 8,665,238 B1 | 3/2014 | Gossweiler, III |
| 8,671,009 B1 | 3/2014 | Coley et al. |
| 8,713,661 B2 | 4/2014 | Vysogorets et al. |
| 8,949,142 B1 | 2/2015 | Angrish |
| 8,977,568 B1 | 3/2015 | Schattauer |
| 9,024,752 B2 | 5/2015 | Tumayan |
| 9,026,461 B2 | 5/2015 | Calman |
| 9,047,512 B2 | 6/2015 | Otis |
| 9,134,955 B2 | 9/2015 | Healey |
| 9,141,325 B2 | 9/2015 | Dersy |
| 9,239,246 B2 | 1/2016 | Jones |
| 9,275,550 B1 | 3/2016 | Stefani |
| 9,541,632 B2 | 1/2017 | Frank |
| 9,552,564 B1 | 1/2017 | Martenis |
| 9,589,262 B2 | 3/2017 | Graylin |
| 9,589,405 B2 | 3/2017 | Cabouli |
| 9,599,989 B1 | 3/2017 | Brown |
| 9,710,920 B2 | 7/2017 | Utsunomiya |
| 9,749,831 B2 | 8/2017 | Lee |
| 2002/0138625 A1 | 9/2002 | Bruner et al. |
| 2003/0034390 A1 | 2/2003 | Linton et al. |
| 2003/0048471 A1 | 3/2003 | Lundgren |
| 2003/0111530 A1 | 6/2003 | Iki et al. |
| 2003/0130769 A1 | 7/2003 | Farley et al. |
| 2003/0146871 A1 | 8/2003 | Karr et al. |
| 2003/0150922 A1 | 8/2003 | Hawes |
| 2003/0220116 A1 | 11/2003 | Sagefalk et al. |
| 2004/0030855 A1 | 2/2004 | Takeuchi et al. |
| 2004/0039617 A1 | 2/2004 | Maycotte et al. |
| 2004/0128193 A1 | 7/2004 | Brice et al. |
| 2004/0249836 A1 | 12/2004 | Reynders et al. |
| 2005/0004919 A1 | 1/2005 | Green et al. |
| 2005/0033666 A1 | 2/2005 | Kurashige |
| 2005/0068232 A1* | 3/2005 | Smith ................ G01S 5/06 342/465 |
| 2005/0071206 A1 | 3/2005 | Berge |
| 2005/0228702 A1 | 10/2005 | Fairbanks et al. |
| 2005/0258230 A1 | 11/2005 | Wiater |
| 2005/0258247 A1 | 11/2005 | Hawes |
| 2006/0004781 A1 | 1/2006 | Burgel et al. |
| 2006/0053076 A1 | 3/2006 | Alspach-Goss et al. |
| 2006/0085236 A1 | 4/2006 | Smith et al. |
| 2006/0085451 A1 | 4/2006 | Pal et al. |
| 2006/0095434 A1 | 5/2006 | McCullough et al. |
| 2006/0097046 A1 | 5/2006 | Baru Fassio et al. |
| 2006/0173680 A1 | 8/2006 | Verhasselt et al. |
| 2006/0238384 A1 | 10/2006 | Hess et al. |
| 2006/0259456 A1 | 11/2006 | Falk et al. |
| 2006/0277231 A1 | 12/2006 | Kral et al. |
| 2006/0288021 A1 | 12/2006 | Kojima |
| 2007/0055416 A1 | 3/2007 | Allen |
| 2007/0072590 A1 | 3/2007 | Levitan |
| 2007/0111725 A1 | 5/2007 | Kauffman et al. |
| 2007/0115165 A1* | 5/2007 | Breen ................ G01S 5/0221 342/29 |
| 2007/0133487 A1 | 6/2007 | Wang et al. |
| 2007/0149216 A1 | 6/2007 | Misikangas |
| 2007/0157078 A1 | 7/2007 | Anderson |
| 2007/0198314 A1 | 8/2007 | Andrew et al. |
| 2007/0203656 A1* | 8/2007 | Sheahan, Jr. ...... G05B 19/4065 702/34 |
| 2007/0203796 A1 | 8/2007 | Riggs |
| 2007/0222595 A1 | 9/2007 | Motteram et al. |
| 2007/0233617 A1 | 10/2007 | Gillespie |
| 2007/0244766 A1 | 10/2007 | Goel |
| 2007/0250356 A1 | 10/2007 | Douglas |

(56) References Cited

U.S. PATENT DOCUMENTS

| | | | |
|---|---|---|---|
| 2007/0252760 A1* | 11/2007 | Smith | G01S 5/0027 342/451 |
| 2007/0265881 A1 | 11/2007 | El Eman et al. | |
| 2007/0273514 A1 | 11/2007 | Winand et al. | |
| 2008/0015926 A1 | 1/2008 | Marcken | |
| 2008/0027765 A1 | 1/2008 | Gunn et al. | |
| 2008/0027955 A1 | 1/2008 | May et al. | |
| 2008/0046298 A1 | 2/2008 | Ben-Yehuda et al. | |
| 2008/0065480 A1 | 3/2008 | Baker et al. | |
| 2008/0070517 A1 | 3/2008 | Brady et al. | |
| 2008/0091445 A1 | 4/2008 | Mihic | |
| 2008/0099552 A1 | 5/2008 | Grillion | |
| 2008/0140226 A1 | 6/2008 | Ganev | |
| 2008/0140434 A1 | 6/2008 | O'Brien | |
| 2008/0224823 A1 | 9/2008 | Lawson et al. | |
| 2008/0229228 A1 | 9/2008 | Cohen | |
| 2009/0010200 A1 | 1/2009 | Lauer et al. | |
| 2009/0015398 A1 | 1/2009 | Bhogal et al. | |
| 2009/0030781 A1 | 1/2009 | Mehta et al. | |
| 2009/0033491 A1 | 2/2009 | Saunders | |
| 2009/0063219 A1 | 3/2009 | Raufaste et al. | |
| 2009/0070841 A1 | 3/2009 | Buga et al. | |
| 2009/0112473 A1 | 4/2009 | Lu et al. | |
| 2009/0164500 A1 | 6/2009 | Mathur et al. | |
| 2009/0182590 A1 | 7/2009 | Ashby et al. | |
| 2009/0187494 A1 | 7/2009 | Heath | |
| 2009/0196201 A1 | 8/2009 | Ric | |
| 2009/0256675 A1 | 10/2009 | Kerr | |
| 2009/0259549 A1 | 10/2009 | Winand et al. | |
| 2009/0266882 A1 | 10/2009 | Sajkowsky | |
| 2009/0287513 A1 | 11/2009 | Anderson et al. | |
| 2009/0307020 A1 | 12/2009 | Viale et al. | |
| 2009/0310530 A1 | 12/2009 | Cerra, II et al. | |
| 2009/0313601 A1 | 12/2009 | Baird et al. | |
| 2010/0027461 A1 | 2/2010 | Bothorel | |
| 2010/0030591 A1 | 2/2010 | Viard et al. | |
| 2010/0065632 A1 | 3/2010 | Babcock et al. | |
| 2010/0076795 A1 | 3/2010 | Steir et al. | |
| 2010/0076826 A1 | 3/2010 | Bayne | |
| 2010/0078475 A1 | 4/2010 | Lin et al. | |
| 2010/0149019 A1* | 6/2010 | Smith | G01S 5/0027 342/30 |
| 2010/0159871 A1 | 6/2010 | Tester | |
| 2010/0190510 A1 | 7/2010 | Maranhas et al. | |
| 2010/0191782 A1 | 7/2010 | Brzozowski | |
| 2010/0198490 A1* | 8/2010 | Breen | G01S 5/0221 701/120 |
| 2010/0198628 A1 | 8/2010 | Rayner | |
| 2010/0205448 A1 | 8/2010 | Tarhan et al. | |
| 2010/0245034 A1 | 9/2010 | D'Oliveiro et al. | |
| 2010/0268656 A1 | 10/2010 | Teicher | |
| 2010/0332358 A1 | 12/2010 | Owens | |
| 2011/0018769 A1 | 1/2011 | Misikangas et al. | |
| 2011/0028160 A1 | 2/2011 | Roeding et al. | |
| 2011/0119183 A1 | 5/2011 | Berman | |
| 2011/0227737 A1 | 9/2011 | Kamins | |
| 2012/0035965 A1 | 2/2012 | Maguire et al. | |
| 2012/0041313 A1 | 2/2012 | Tanaka | |
| 2012/0042263 A1 | 2/2012 | Rapaport et al. | |
| 2012/0042371 A1 | 2/2012 | Gur et al. | |
| 2012/0075168 A1 | 3/2012 | Osterhout et al. | |
| 2012/0101885 A1 | 4/2012 | Lee et al. | |
| 2012/0123844 A1 | 5/2012 | Fano et al. | |
| 2012/0129546 A1 | 5/2012 | Yang et al. | |
| 2012/0200390 A1 | 8/2012 | Saravanan | |
| 2012/0203578 A1 | 8/2012 | Baggett et al. | |
| 2012/0284108 A1 | 11/2012 | Fontana et al. | |
| 2013/0069985 A1 | 3/2013 | Wong et al. | |
| 2013/0141313 A1 | 6/2013 | Zhou et al. | |
| 2013/0211864 A1 | 8/2013 | Sanderson et al. | |
| 2013/0234849 A1 | 9/2013 | Gupta et al. | |
| 2013/0267255 A1 | 10/2013 | Liu et al. | |
| 2013/0295966 A1 | 11/2013 | Dingler et al. | |
| 2013/0297103 A1 | 11/2013 | Baker et al. | |
| 2013/0325526 A1 | 12/2013 | Tyler | |
| 2014/0006070 A1 | 1/2014 | Stamler | |
| 2014/0012640 A1 | 1/2014 | Roberts et al. | |
| 2014/0039717 A1 | 2/2014 | Henkel | |
| 2014/0052482 A1 | 2/2014 | Le Marier et al. | |
| 2014/0067244 A1 | 3/2014 | Baker et al. | |
| 2014/0123315 A1 | 5/2014 | Baker et al. | |
| 2014/0188311 A1* | 7/2014 | Masson | B64D 43/00 701/3 |
| 2014/0223043 A1 | 8/2014 | Dersy | |
| 2015/0278596 A1* | 10/2015 | Kilty | G06K 9/00476 382/113 |
| 2016/0152350 A1 | 6/2016 | Puentes | |
| 2016/0176538 A1* | 6/2016 | Bekanich | B64D 45/00 701/14 |
| 2016/0180255 A1 | 6/2016 | Goedemondt | |
| 2017/0004444 A1 | 1/2017 | Krasko | |
| 2017/0032263 A1 | 2/2017 | Yuan | |

FOREIGN PATENT DOCUMENTS

| | | |
|---|---|---|
| DE | 102009020228 A1 | 11/2010 |
| EP | 1308864 A1 | 5/2003 |
| EP | 1318463 A1 | 6/2003 |
| EP | 0770546 B1 | 12/2003 |
| EP | 1454306 A2 | 9/2004 |
| EP | 1 610 094 A1 | 12/2005 |
| EP | 1679624 A2 | 7/2006 |
| EP | 1874001 B1 | 1/2008 |
| EP | 2088543 A1 | 8/2009 |
| EP | 2088569 A1 | 8/2009 |
| EP | 2222053 A1 | 8/2010 |
| EP | 2290600 A2 | 3/2011 |
| EP | 2362354 A2 | 8/2011 |
| EP | 2390845 A1 | 11/2011 |
| EP | 2474931 A1 | 7/2012 |
| EP | 2932902 B1 | 12/2016 |
| EP | 1872294 B1 | 11/2017 |
| GB | 2366945 A | 3/2002 |
| GB | 2408131 B | 3/2006 |
| GB | 2418511 A | 3/2006 |
| GB | 2469026 A | 10/2010 |
| GB | 2470897 A | 12/2010 |
| JP | 2003157984 A | 5/2003 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| JP | 2017129981 A | 7/2017 |
| WO | 0073954 A2 | 12/2000 |
| WO | 200135269 A2 | 5/2001 |
| WO | 200135289 A1 | 5/2001 |
| WO | 03005237 A1 | 8/2001 |
| WO | 2001057323 A1 | 8/2001 |
| WO | 0215582 A1 | 2/2002 |
| WO | 2004045106 A1 | 5/2004 |
| WO | 2004098111 A2 | 11/2004 |
| WO | 2006010774 A1 | 2/2006 |
| WO | 2008055181 A2 | 5/2008 |
| WO | 2009002139 A1 | 12/2008 |
| WO | 2009021068 A1 | 2/2009 |
| WO | 2009058505 A1 | 5/2009 |
| WO | 2009091553 A1 | 7/2009 |
| WO | 2011057323 A1 | 5/2011 |
| WO | 2011088233 A1 | 7/2011 |
| WO | 2012105829 A2 | 8/2012 |
| WO | 2012106075 A1 | 8/2012 |
| WO | 2013079512 A1 | 6/2013 |

OTHER PUBLICATIONS

Secure ATC surveillance for military applications; Kenney, L.; Dietrich, J.; Woodall, J.; Military Communications Conference, 2008. MILCOM 2008. IEEE; Year: 2008; pp. 1-6, DOI: 10.1109/MILCOM.2008.4753368.*
Effectiveness of the ground-based transceiver (GBT) parrot system for monitoring GPS integrity for Alaska ATC "radar-like services"

(56) References Cited

OTHER PUBLICATIONS using ADS-B; Lee, Y.C.; Moody, J.C., Jr.; Reagan, J.K.; Digital Avionics Systems Conference, 2004. DASC 04. The 23rd Year: 2004, vol. 1; pp. 11-15 vol. 1, DOI: 10.1109/DASC.2004.1391238.*
Evaluation of CPDLC and voice communication during approach phase; Glaser-Opitz, H.; Glaser-Opitz, L; Digital Avionics Systems Conference (DASC), 2015 IEEE/AIAA 34th; Year: 2015; pp. 2B3-1-2B3-10, DOI: 10.1109/DASC.2015.7311363.*
Differential operation of the Global Positioning System; P. K. Enge; R. M. Kalafus; M. F. Ruane; IEEE Communications MagazineYear: 1988, vol. 26, Issue: 7 ; pp. 48-60; IEEE Jourals & Magazines.*
A Statistical Inference Technique for GPS Interference Detection; Asghar Tabatabaei Balaei; Andrew G. Dempster; IEEE Transactions on Aerospace and Electronic Systems; Year: 2009, vol. 45, Issue: 4 pp. 1499-1511; IEEE Journals & Magazines.*
International Search Report and Written Opinion dated Mar. 2, 2016 in International PCT Application No. PCT/GB2015/053679.
International Search Report dated Mar. 16, 2015 in UK Patent Application No. GB1421394.6.
www.flightradar24.com as of Dec. 1, 2014.
Caliendo, et al., Social Networks, Job Search Methods and Reservation Wages: Evidence for Germany, IZA, Sep. 2010, Germany.
International Search Report and Written Opinion mailed in International Application No. PCT/EP2014/055037 filed Mar. 13, 2014.
International Search Report and Written Opinion mailed in International Application PCT/EP2015/068682 dated Oct. 29, 2015.
International Search Report and Written Opinion mailed in Singapore Application No. 11201404575U dated Jun. 16, 2015.
Search Report and Written Opinion dated Apr. 2, 2014 in GB Application No. 1317659.9.
Aircom Server Administrator Guide, SITA Airline Telecommunications and Information Services, Feb. 19, 2013, pp. 1-280.
Aircom Server User Guide, SITA Airline Telecommunications and Information Services, Jan. 24, 2013, pp. 1-153.
Chen, et al., "A Survey of Context-Aware Mobile Computing Research", Department of Computer Science, Dartmouth College, pp. 1-16, Hanover, New Hampshire.
Examination Report of Malaysian Application No. 2013001405, received from the Intellectual Property Corporation of Malaysia dated Oct. 28, 2014.
Examination Report received in Malaysian Application No. PI 2013000936.
Glushko, et al., Bridging the "Front Stage" and "Back Stage" in Service System Design, Proceedings of the 41st Hawaii International Conference on System Sciences, 2008, pp. 1-10, California.
International Search Report and the Written Opinion mailed in International Application No. PCT/EP2013/052590 filed Aug. 2, 2013.
International Search Report and the Written Opinion mailed in International Application No. PCT/EP2013/057497 filed Oct. 4, 2013.
International Search Report and Written Opinion mailed in International Application No. PCT/EP2011/070551 filed Nov. 21, 2011.
International Search Report and Written Opinion mailed in International Application No. PCT/EP2014/062464 filed Jun. 13, 2014.
International Search Report and Written Opinion mailed in International Application No. PCT/EP2015/053319 filed Feb. 17, 2015.
International Search Report mailed in International Application No. PCT/EP2011/072286 filed on Sep. 12, 2011.
Kindervater, Revenue Management in the Airline Passenger Industry, 2007, pp. 1-24.
Kinneging, Machine Readable Travel Documents-Technical Report, PKI for Machine Readable Travel Documents Offering ICC Read-Only Access, PKI Task Force, International Civil Aviation Organization, Version 1.1, Oct. 1, 2004, pp. 1-58.
Kirby, Personal Services—In-flight connectivity poised to change the passenger experience for ever, http://www.flightglobal.com/news/articles/personal-services-in-flight-connectivity-poised-to-change-the-passenger-experience-for-332765/, Article dated Se.
Kitson, The Future of In-flight: Part Two—The Concierge Concept, http://ustwo.com/blog/the-future-of-in-flight-part-two-the-concierge-concept/, Article dated Apr. 2012.
Li, et al., XVM: A Bridge Between XML Data and Its Behavior, May 17-22, 2004, pp. 1-9, New York.
Machine Readable Travel Documents, Part 1, Machine Readable Passports—vol. 1, Passports with Machine Readable Data Stored in Optical Character Recognition Format, International Civil Aviation Organization, Sixth Edition, 2006, pp. 1-99.
Machine Readable Travel Documents, Part 1, Machine Readable Passports—vol. 2, Specifications for Electronically Enabled Passports with Biometric Identification Capability, International Civil Aviation Organization, Sixth Edition, 2006, pp. 1-131.
Machine Readable Travel Documents, Part 3, Machine Readable Official Travel Documents—vol. 1, MRtds with Machine Readable Data Stored in Optical Character Recognition Text, International Civil Aviation Organization, Third Edition, 2008, pp. 1-122.
Machine Readable Travel Documents, Part 3, Machine Readable Official Travel Documents—vol. 2, Specifications for Electronically Enabled MRtds with Biometric Identification Capability, International Civil Aviation Organization, Third Edition, 2008, page.
Madria, et al., An XML Schema Integration and Query Mechanism System, Science Direct, Data and Knowledge Engineering 65, 2008, pp. 266-303.
Marmasse, et al., Location-aware information delivery with comMotion, MIT Media Laboratory, HUC 2000 Proceedings, 2000, pp. 157-171.
McGuire, et al., The Future of Revenue Management, SAS Global Forum, 2009, pp. 1-5.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-.
Russian Search Report for 2013133853/08(050668) dated Feb. 20, 2015.
Schechner, Airlines Entertain Tablet Ideas—Rather Than Wiring Planes for In-Flight Movies, Some Hand Out iPads, http://online.wsj.com/articles/
SB10000872396390443916104578020601759253578, Article dated Sep. 2012.
Schwinger, et al., Context-Awareness in Mobile Tourism Guides—A Comprehensive Survey, 2002, pp. 1-20.
Search Report and Examination Opinion mailed in International Application No. GB1421313.6.
Search Report and Written Opinion mailed in International Singapore Application No. 201306353-2, dated Apr. 11, 2014, by the Danish Patent and Trademark Office.
Search Report and Written Opinion of Singapore Application No. 201301980-7, dated Sep. 3, 2013.
Smith, et al., Yield Management at American Airlines, American Airline Decision Technologies, 1992, pp. 8-31.
Susan Stellin, "Automation Is Considered for Checking IDs in Airports", Business Day, The New York Times, Mar. 19, 2012, 3 pages, retrieved Sep. 4, 2014, http://www.nytimes.com/2012/03/20/business/tsa-is-considering-automating-id-checks.html.
Written Opinion mailed in Singapore Application No. 201301978-1, dated Oct. 15, 2013.
Xu, et al., A Model of Capacity Control with Overbooking for a Two-leg Airlines Network, IEEE 2008, pp. 1-5.
Dunkel, et al., Model-Driven Architecture for Mobile Applications, 2007, pp. 464-477, Hanover, Germany.
Johnston, et al., Multimodal Applications from Mobile to Kiosk, pp. 1-4.
Munoz, et al., Context-Aware Mobile Communication in Hospitals, IEEE Computer Society, 2003, pp. 38-46.

* cited by examiner

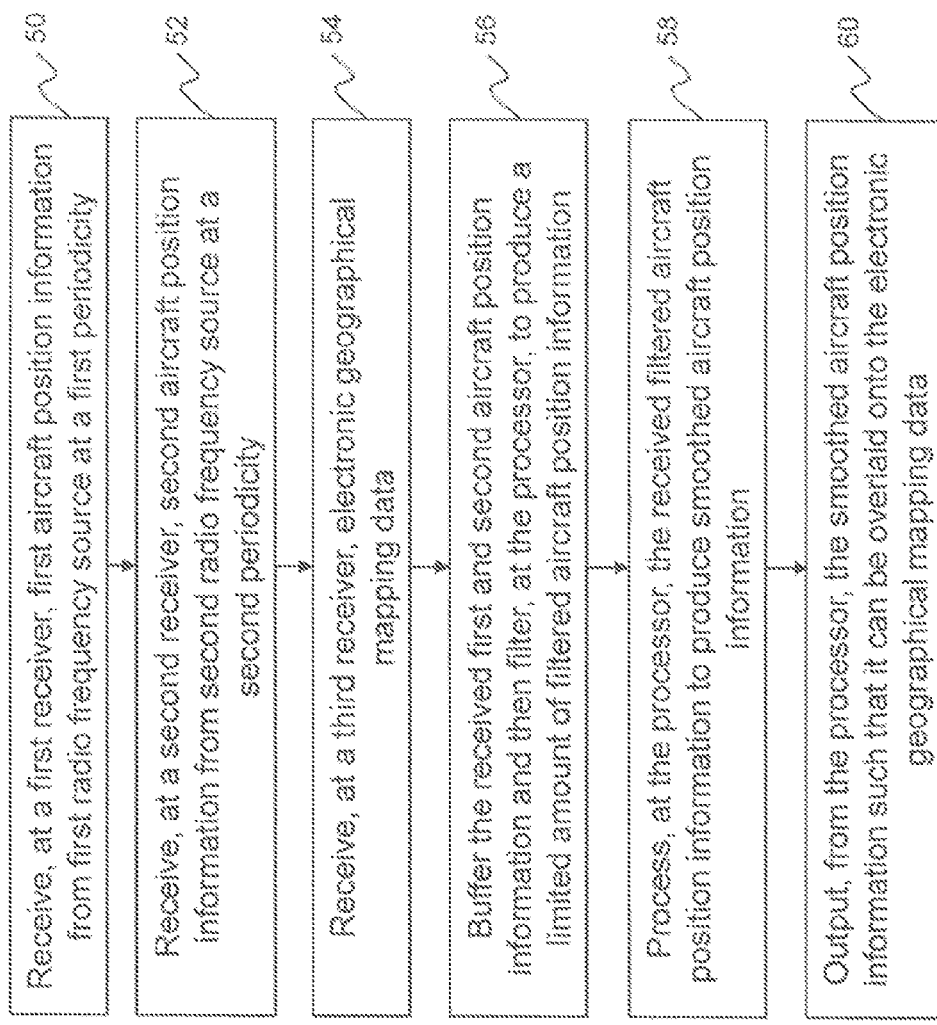

APPARATUS FOR MONITORING AIRCRAFT POSITION

FIELD OF THE INVENTION

The present invention relates to an apparatus and method for monitoring the positions of one or more aircraft. In particular, the present invention relates to an apparatus and method for monitoring the position of a given aircraft accurately and autonomously.

BACKGROUND TO THE INVENTION

Current aircraft monitoring systems typically use aircraft communications addressing and reporting system (ACARS) data in combination with radar data in order to track the progress of aircraft. This data may be used by air traffic controllers or alternatively provided as a service to aircraft operators.

In the ACARS system, each aircraft is fitted with a VHF transceiver for providing a data link between the aircraft on-board equipment and ground equipment. This data link may be provided through a direct transmission from the aircraft to a ground station, or alternatively the aircraft may transmit the data to a satellite, which then forwards the data to a satellite ground station. These transmissions are received at the ground stations by a data link service provider that then routes the data to the air traffic controllers or aircraft operators.

The periodicity within which a given aircraft will emit ACARS data transmissions is configured by the operating airline and is typically in the order of ten to twenty minutes. This is generally determined in order to provide a balance between receiving up to date data and the per message costs associated with the data transfer. In view of this relatively long period between consecutive message transmissions, the time stamp for any given ACARS transmission is only accurate to within a minute and the position data is reported within accuracy of three decimal places. This means that significant distances can be covered by an aircraft between consecutive ACARS transmissions, which can in turn lead to an uncertainty in the estimated position and path of an aircraft.

Furthermore, if the aircraft is forced to circle in a given area of airspace, for example, in an airport holding pattern, this will not be immediately apparent from the ACARS data as the aircraft will likely have performed a full circle by the time a subsequent ACARS transmission is carried out. This can lead those monitoring the ACARS data to be unsure as to whether these data transmissions are erroneous or if the aircraft truly has remained in a given area of airspace between subsequent ACARS transmissions.

Increasing the frequency (i.e. reducing the period between consecutive transmissions) of ACARS messaging would provide a more up to date set of position data; however, since this ACARS system is a one-to-one digital data link system, this would place a large burden on the ACARS network. This would overload the network, which would then reduce the reliability and accuracy of the network. Accordingly another solution to this problem must be found.

One alternative data source for aircraft position information is to use primary and/or secondary radar installations. Primary radar is an independent method of monitoring the location of a given target aircraft and simply uses the well known principle of emitting a high power radio transmission and then detecting the reflected transmissions from any object that is in the radar's field of view.

In secondary radar, the target aircraft must be fitted with a transponder such that the aircraft can identify itself, in response to an interrogation signal emitted by the radar installation, using a code that has been issued to that aircraft by an air traffic controller. Radar systems have the advantage that aircraft position can be tracked with a greater frequency in order to more accurately monitor a given aircraft's flight path; however, each radar installation requires a very high amount of power in order to transmit the radar pulse over the operational range of the radar system. Furthermore, radar systems are very expensive to install and maintain, especially over large areas.

It has been appreciated by the present applicants that a more accurate system for monitoring aircraft positions that can be implemented using comparatively low cost apparatus is required.

SUMMARY OF THE INVENTION

According to a first aspect of the invention, there is provided an apparatus for monitoring the positions of one or more aircraft. The apparatus comprises a first receiver device configured to receive first aircraft position information, over a digital data link, from a first radio frequency source located onboard the aircraft at a first periodicity, via one or more ground stations and a second receiver device configured to receive second aircraft position information broadcasted from a second radio frequency source located onboard the aircraft at a second periodicity, via one or more ground stations.

The apparatus additionally comprises a third receiver device configured to receive electronic geographical mapping data and a buffer configured to receive the first and second aircraft position information from the first and second receiver devices respectively. The apparatus further comprises a processor configured to receive and to filter the buffered first and second aircraft position information. The processor is further configured to smooth the filtered aircraft position information and to output the smoothed aircraft position information such that it can be overlaid onto the electronic geographical mapping data. The processor is configured to filter the first and second aircraft position information such that the quantity of position information data smoothed for a given aircraft is within a given limit for a given time period.

The apparatus advantageously enables multiple sources of information regarding a given aircraft's position that are of varying accuracy, frequency and quality to be combined and consolidated into a consistent output that delivers highly accurate and dynamic aggregate aircraft position information with the ability to track flight deviations in substantially real-time. Furthermore, the aircraft's position with respect to weather patterns or other specific regions or airspace can be tracked with a greater degree of certainty in order to support the relevant aircraft operator decision making processes by providing increased real-time aircraft location visibility. The receiver devices may be hardware-implemented or alternatively may be implemented in software.

The processor may optionally be configured to filter the aircraft position information based on the relative positional accuracy and the relative temporal accuracy of the respective sources that the aircraft position information is received from. In this embodiment, the processor advantageously enables the apparatus to only smooth the most accurate information that is received from the respective sources within a given period of time.

The smoothing of aircraft position information may optionally comprise removing erroneous data points or data points of a lower quality or may comprise averaging specific pairs or groups data points. This enables any conflicts or errors in the multiple data sets to be resolved such that a consistent progression of the aircraft's position can be output.

In some embodiments of the invention, the second periodicity is shorter than the first periodicity, i.e. the second aircraft position information may be broadcast with a higher frequency of transmission than the first aircraft position information. In one example, the first aircraft position information is received, at the first receiver, from an Aircraft Communications Addressing and Reporting System transceiver. In a further example, the second aircraft position information is received, at the second receiver, from an Automatic Dependent Surveillance-Broadcast transmitter.

The first and second aircraft position information may be received via one or more of a VHF ground station, a HF ground station or a satellite ground station. These ground stations allow for the transmissions from the aircraft to be received directly at ground level or alternatively via one or more satellites.

Advantageously, the apparatus may further comprise a fourth receiver configured to receive radar aircraft position data, wherein the processor is configured to filter the radar aircraft position data in combination with the first and second aircraft position information such that the quantity of position information data smoothed is within a given limit for a given time period.

In some embodiments of the invention, the apparatus further comprises a fifth receiver configured to receive weather data, wherein the processor is further configured to output the weather data such that it can be overlaid onto the electronic geographical mapping data. This advantageously enables users to accurately track the aircraft's position with respect to weather patterns in order to support the relevant aircraft operator in its decision making processes. For example, the aircraft operator may be able to determine that a given aircraft will need to be diverted from its planned route, thus allowing the aircraft operator to consider any knock on effects that this diversion may have ahead of time.

In another advantageous embodiment of the invention, the apparatus may further comprise a sixth receiver configured to receive flight plan data corresponding to the aircraft, wherein the processor is configured to output the flight plan data such that it can be overlaid onto the electronic geographical mapping data and smoothed aircraft position information. This improves the visibility of any deviations that the aircraft may make from its planned route, thus allowing these deviations to be quickly identified and any resulting change in the expected time of arrival of the aircraft at its destination to be determined.

Advantageously, the buffer may be a circular buffer and the processor filter may comprise a sampling filter for filtering and sorting the aircraft position information to be included in a reduced set of aircraft position information. This allows the evolving and incomplete aircraft position information received from the plurality of receivers to be interpreted and harmonised before it is aggregated. The sampling filter is optionally based on temporal and precision criteria.

In a further embodiment of the invention, the processor may be configured to identify aircraft position data relating to a given aircraft by a data matching engine.

Advantageously, the apparatus may further comprise storing the smoothed aircraft position information in a data store, for subsequent analysis. This analysis can enable aircraft operators to determine any inefficiencies that have occurred in their past operations such that they can be taken into consideration and used to optimise future operations.

In a further embodiment, the processor may be configured to output extrapolated aircraft position information such that it can be overlaid onto the electronic geographical mapping data in the event that no aircraft position information is received at the processor for a given aircraft within a given time period. This allows, for example, the estimated impact of current or predicted weather patterns or other specific regions or airspace to be tracked accurately, even when aircraft position information has not been received for a short while, in order to support the relevant aircraft operator decision making processes.

In yet another embodiment, the processor may be configured to output ACARS aircraft position information such that it can be overlaid onto the electronic geographical mapping data alongside the smoothed aircraft position information in the event that the ACARS aircraft position information does not form part of the smoothed aircraft position information. In this manner, the ACARS position information may be displayed on the mapping data even if it has been filtered out by the processor due to the availability of more accurate aircraft position information.

According to a second aspect of the invention, there is provided a computerised method for monitoring the positions of one or more aircraft. The computerised method comprises receiving, at a first receiver device, first aircraft position information, over a digital data link, from a first radio frequency source located onboard the aircraft at a first periodicity, via one or more ground stations; receiving, at a second receiver device, second aircraft position information broadcasted from a second radio frequency source located onboard the aircraft at a second periodicity, via one or more ground stations; and receiving, at a third receiver device, electronic geographical mapping data.

The computerised method further comprises receiving, at a buffer, the received first and second aircraft position information; processing, at a processor, the buffered first and second aircraft position information to filter the first and second aircraft position information, processing, at the processor, the filtered aircraft position information to produce smoothed aircraft position information; and outputting, from the processor, the smoothed aircraft position information such that it can be overlaid onto the electronic geographical mapping data. In the computerised method, the processor filters the first and second aircraft position information such that the quantity of position information data smoothed for a given aircraft is within a given limit for a given time period. This advantageously allows users, such as aircraft operators, access to an accurate consolidation of multiple sources of position information regarding a given aircraft and for this information to be presented visually in a user friendly format over electronic mapping data.

The filtering of the aircraft position information may be based on the relative positional accuracy and the relative temporal accuracy of the respective sources that the aircraft position information is received from. In this embodiment, the processor advantageously enables the apparatus to only smooth the most accurate information that is received from the respective sources within a given period of time.

The smoothing of aircraft position information may optionally comprise removing erroneous data points or data points of a lower quality or may comprise averaging specific pairs or groups data points. This enables any conflicts or errors in the multiple data sets to be resolved such that a consistent progression of the aircraft's position can be output.

In some embodiments of the invention, the second periodicity is shorter than the first periodicity, i.e. the second aircraft position information may be broadcast with a higher frequency of transmission than the first aircraft position information. In one example, the first aircraft position information is received, at the first receiver, from an Aircraft Communications Addressing and Reporting System (ACARS) transceiver and the first aircraft position information is ACARS aircraft position information. In a further example the second aircraft position information is received, at the second receiver, from an Automatic Dependent Surveillance-Broadcast transmitter.

The first and second aircraft position information may be received via one or more of a VHF ground station, a HF ground station or a satellite ground station. These ground stations allow for the transmissions from the aircraft to be received directly at ground level or alternatively via one or more satellites.

Advantageously, the computerised method may further comprise receiving, at a fourth receiver, radar aircraft position data and filtering the radar aircraft position data in combination with the first and second aircraft position information such that the quantity of position information data smoothed at the processor is within a given limit for a given time period.

In some embodiments of the invention, the computerised method further comprises receiving, at a fifth receiver, weather data and then outputting, from the processor, the weather data such that it can be overlaid onto the electronic geographical mapping data. This advantageously enables users to accurately track the aircraft's position with respect to weather patterns in order to support the relevant aircraft operator in its decision making processes. For example, the aircraft operator may be able to determine that a given aircraft will need to be diverted from its planned route, thus allowing the aircraft operator to consider any knock on effects that this diversion may have ahead of time.

In another advantageous embodiment of the invention, the computerised method may comprise receiving, at a sixth receiver, flight plan data corresponding to the aircraft and outputting, from the processor, the flight plan data such that it can be overlaid onto the electronic geographical mapping data and smoothed aircraft position information. This improves the visibility of any deviations that the aircraft may make from its planned route, thus allowing these deviations to be quickly identified and any resulting change in the expected time of arrival of the aircraft at its destination to be determined.

Advantageously, the buffer may be a circular buffer and the processor filter may comprise a sampling filter to filter and sort the aircraft position information to be included in a reduced set of aircraft position information. This allows the evolving and incomplete aircraft position information received from the plurality of receivers to be interpreted and harmonised before it is aggregated. The sampling filter is optionally based on temporal and precision criteria.

In a further embodiment of the invention, the method may further comprise identifying, at the processor, aircraft position data relating to a given aircraft by a data matching engine.

Advantageously, the computerised method may comprise storing the smoothed aircraft position information in a data store, for subsequent analysis. This analysis can enable aircraft operators to determine any inefficiencies that have occurred in their past operations such that they can be taken into consideration and used to optimise future operations.

In a further embodiment, the computerised method may comprise the step of outputting extrapolated aircraft position information such that it can be overlaid onto the electronic geographical mapping data in the event that no aircraft position information is received at the processor for a given aircraft within a given time period. This allows, for example, the estimated impact of current or predicted weather patterns or other specific regions or airspace to be tracked accurately, even when aircraft position information has not been received for a short while, in order to support the relevant aircraft operator decision making processes.

In yet another embodiment, the computerised method may include outputting ACARS aircraft position information such that it can be overlaid onto the electronic geographical mapping data alongside the smoothed aircraft position information in the event that the ACARS aircraft position information does not form part of the smoothed aircraft position information. In this manner, the ACARS position information may be displayed on the mapping data even if it has been filtered out by the processors due to the availability of more accurate aircraft position information.

BRIEF DESCRIPTION OF THE DRAWINGS

Embodiments of the invention will now be described, by way of example only, and with reference to the accompanying drawings, in which:

FIG. 4 is a flow diagram showing the main steps performed by an embodiment of the invention;

DESCRIPTION OF THE INVENTION

Increasing numbers of aircraft are now being equipped with Automatic Dependent Surveillance-Broadcast (ADS-B) equipment, whereby each aircraft uses its global positioning system (GPS) to determine its position and then this position information is broadcast, along with further information such as the aircraft ID or transponder code, callsign, altitude, heading and velocity, using a radio frequency transceiver at a relatively regular period, for example, approximately once every second.

In line with this increased frequency, the ADS-B data broadcast by the aircraft is also more accurate. In ADS-B, the position data is reported within an accuracy of five decimal places and the corresponding time stamp is accurate to within one second. This increased accuracy allows ADS-B data to be of a higher quality than even radar location data. Furthermore, ADS-B systems can be implemented over larger areas at a fraction of the cost and maintenance required for radar installations.

The ADS-B system was originally designed in order to provide an additional input for the aircraft Traffic Collision Avoidance Systems (TCAS) of neighbouring aircraft, in this manner each aircraft could broadcast its identity, location and heading to the other aircraft in range of the transmissions. However, it has been appreciated that this ADS-B data could be utilised by ground systems for improved aircraft monitoring, provided that a receiver can be positioned within range of the aircraft.

Figure 1:
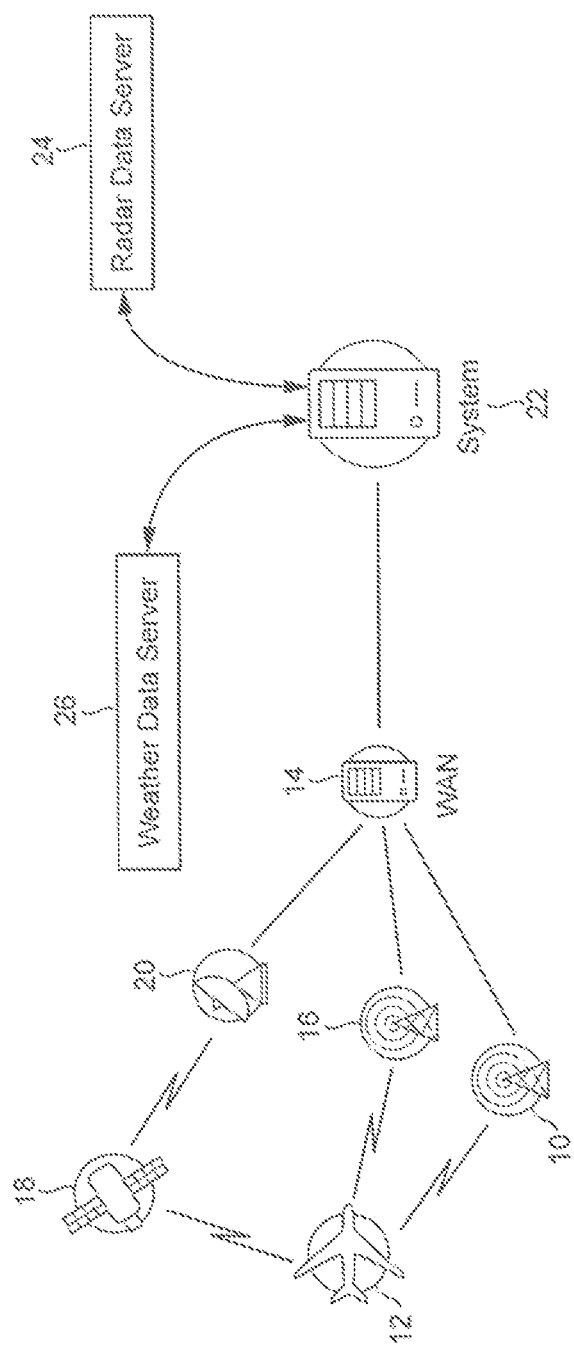
FIG. 1 is a schematic representation of an apparatus according to an embodiment of the invention interacting with the data sources.

According to a first aspect of the invention, and with reference to FIG. 1, ADS-B data can be used to monitor aircraft 12 over large regions of airspace by providing a network of receivers 10. Furthermore, the airspace coverage of such an apparatus can be extended simply by providing additional receivers, or ground stations 10, and connecting these ground stations to the existing ground stations using a communications network.

The communications network may be any public, private, wired or wireless network. The communications network may include one or more of a local area network (LAN), a wide area network (WAN) 14, the Internet, a mobile telephony communication system, or a satellite communication system. The communications network may comprise any suitable infrastructure, including copper cables, optical cables or fibres, routers, firewalls, switches, gateway computers and edge servers.

These ground stations 10 may comprise VHF ground stations or HF ground stations that operate on the VHF or HF radio frequency ranges respectively. The term "ground station" is used herein to refer to any receiver station at ground level. For the avoidance of doubt, these ground stations may include receivers located on ocean platforms, such as oil rigs, or floating vessels, such as tankers or aircraft carriers. Furthermore, separate ground stations may be used to receive the ACARS messages and ADS-B data, or alternatively the respective receivers may be combined into a single ground station. The data from each ground station may then be collected by the network 14 and combined to form a consolidated database of ADS-B data that may be used for monitoring aircraft 12 within the range of the network of ground stations 10. The airspace coverage of each ground station is in the form of a line of sight cone with an operational range of around 200 nautical miles.

The location of the ground stations 10 are typically not relevant as all of the necessary position data is transmitted by the ADS-B fitted aircraft 12; however, in some apparatus', these transmissions may be used as part of a multilateration system in order to triangulate the position of an aircraft 12. This could be advantageous, for example, if it is suspected that there is an error in the positional data emitted by the aircraft 12.

In the present apparatus, the aircraft 12 broadcasts ADS-B data substantially continuously, i.e. with a short period such as 1 second, such that a stream of substantially real-time aircraft position information can be received by ADS-B data receiver boxes, known as ground stations 10. The aircraft 12 also transmits ACARS messages, some of which may contain aircraft position information, which are received by ACARS ground stations 16 in the usual manner and forwarded through a digital data link system. These ACARS messages are transmitted with a comparatively long period, such as in the order of 10 minutes. The signal for the ACARS messages may be direct from the aircraft to the ground station 16, or alternatively the message may be routed via a satellite link 18 (in which case the ground station would be a satellite ground station 20).

The ADS-B data and ACARS messages containing position information are then collected centrally by the apparatus 22. The apparatus 22 may additionally receive radar aircraft position information from a radar data server 24 and/or weather data from a weather data server 26 as will be set out below.

Since the ADS-B data and ACARS messages come from multiple sources of varying frequency and quality, it is likely that there will be irregularities and conflicts in the position data, which if simply plotted without further processing could result in a zig-zag path when the aircraft 12 is in fact travelling in a straight line, or alternatively could lead to the position of the aircraft 12 being reported to have jumped hundreds of miles off course when the aircraft 12 is in fact still travelling the expected flight plan.

These conflicts would cause integrity issues in relation to the exactness and precision of the aggregated position and trajectory of a given aircraft. Furthermore, there would be severe performance issues in the display latency if an application attempted to plot all of the data points. This performance issue is exacerbated in the situation where internet browsers are used to access the data as browsers are not natively designed to display such large data sets in real-time.

The apparatus 22 may receive aircraft position information at a rate of once per second per flight for 10,000 flights simultaneously. This volume of data is simply too large for an internet browser to handle in real-time without crashing. Accordingly, it is desirable to regulate the volume of data to produce a reduced data set, whilst maintaining the highest degree of accuracy possible. This allows a large volume of data to be received without overloading the apparatus 22 or any system for displaying the data output from the apparatus 22.

Figure 2:
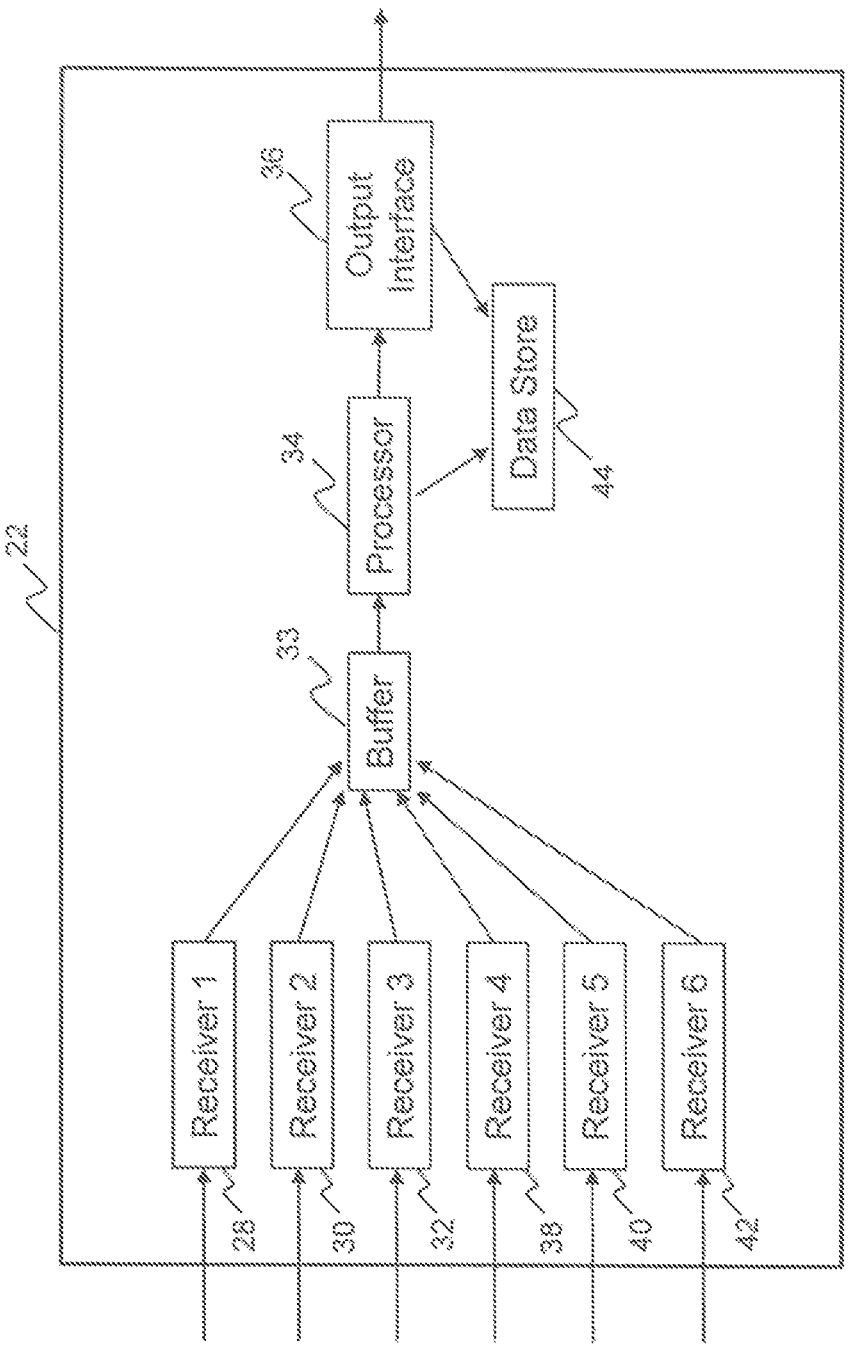
FIG. 2 is a schematic representation of an apparatus according to an embodiment of the invention.

In order to address this problem, with reference to FIG. 2, the apparatus 22 may receive ACARS messages containing aircraft position information from the aircraft 12 at a first receiver 28 and receive ADS-B aircraft position information from the aircraft 12 at a second receiver 30. Furthermore, mapping data may be received at a third receiver 32 for constructing an electronic geographical map including the geographical area that a given aircraft 12 is operating in.

The combined position information received at the first 28 and second 30 inputs can then be received at a buffer 33 before being processed. In order to remedy the data integrity issues that arise from the asynchronous nature of the arriving data, in a first step of the processing, a data matching engine comprising sophisticated algorithms is implemented to uniquely identify a given aircraft by combining partial data from multiple data sets. For example, one data set may refer to the aircraft by its tail number, whereas another data set may refer to the same aircraft by its current flight number. If this data is not matched and consolidated then the apparatus would attempt to plot two different aircraft when they actually represent the same aircraft.

The data matching engine is based on a large decision tree that takes a variety of position information that come in asynchronously as the input and then compares, orders and prioritises the position information so as to resolve the contradictions and false positives.

For example, ADS-B data and radar data typically identify an aircraft by the International Civil Aviation Organisation (ICAO) call sign, whereas ACARS data typically uses the International Air Transport Association (IATA) flight identifier. Accordingly, in some embodiments a dynamic table is created in order to maintain the relationship between ICAO call signs and IATA flight identifiers. This relationship may be determined based on items of data that indicate both the call sign and the flight identifier for a given flight, or alternatively it may be determined by identifying an intermediate item of data, such as the aircraft registration, which may be separately linked to a call sign and a flight identifier.

The data received may also be delayed due to network coverage issues, which can lead to a number of aircraft position information messages being received in bulk at the same time. The aircraft position information messages include timestamp data and so these messages are preferably arranged into their proper time wise order before the data is output by the output interface 36 of the system 22.

However, a given aircraft may have landed and subsequently taken off again before the aircraft enters network coverage, in which case the aircraft would have received a new identification to represent the new flight. Accordingly, the bulk of messages may include messages that relate to the previous flight. If the processor 34 determines that the aircraft position information does not relate to the current flight identification, or it is otherwise not possible to arrange the messages in the correct order, then this aircraft position information is preferably discarded.

A further example is the situation wherein an aircraft flies into an ADS-B data coverage zone such that the system 22 starts to receive ADS-B part way through the aircraft's flight. In this situation, the system 22 will already have been receiving aircraft position information regarding the aircraft from another source, for example ACARS data, and it will be preferable to determine if the new ADS-B data corresponds to a new aircraft to be plotted or alternatively if it corresponds to the existing aircraft. From the result of this determination, the new data may be merged and harmonised with the existing data.

One way of determining if the new data corresponds to an existing aircraft data feed would be to determine the positional distance between a pair of aircraft position information data points from the respective data feeds that correspond to positions within a given time frame and to further determine if it would be feasible for the same aircraft to have covered the determined distance in that amount of time. This can be used as a sense check to verify that data feeds using different means for identifying a given aircraft do correspond to the same aircraft rather than a different aircraft that has been used to replace the aircraft that was originally intended to fly that route, for example due to delays.

Various sources of data may also identify an "off-time", when the aircraft takes off, and an "on-time", when the aircraft lands. There may be a discrepancy of a few minutes between these respective times and accordingly the processor 34 must determine which of these sources is to be prioritised based on the relative accuracy of the data sources.

The processor 34 may then proceed to filter and smooth the data in order to arrive at a reduced data set. The buffer 33 may be a circular buffer and the filtering may involve using a sampling filter that samples based on temporal and precision criteria. For example, it may be only the top 4 most accurate data points received within a period of one minute that are smoothed and plotted onto the electronic geographical mapping data. Alternatively, the filtering may select only the most accurate data point received within the last minute.

As described above, ADS-B data is broadcast with a positional accuracy of five decimal places and a temporal accuracy of 1 second; accordingly ADS-B data will be preferenced over ACARS data, which has a positional accuracy of three decimal places and a temporal accuracy of 1 minute, when filtering the aircraft position information received within a given time period to ensure that the total number of data points in that time period does not exceed the limit.

The smoothing process may include averaging position information between the filtered data points. This smoothed aircraft position information data may then be output by the processor 34 to an output interface 36 and presented as a layer overlaid on the electronic geographical mapping data on a display device.

The processor 34 may comprise one or more special purpose processing devices such as an application specific integrated circuit (ASIC), a field programmable gate array (FPGA), a digital signal processor (DSP), network processor, or other similar devices. The processor 34 is configured to perform the operations and methods disclosed below. These operations may be carried out by a single processor or, alternatively, may be carried out by a number of processors connected together.

In the event that no aircraft position information is received for a given aircraft from any of the position information sources within a given time period, the position of the aircraft may be estimated by extrapolating the aircraft's previous flight speed and trajectory. This estimated position may be plotted on the electronic geographical mapping data and may also be marked out in some manner to highlight that it is only an estimated aircraft position and not an actual received aircraft position.

In the event that no ACARS aircraft position information is plotted onto the electronic geographical mapping data for a given time period (because the received ACARS aircraft position information has been filtered out in favour of more accurate aircraft position information) the processor may be configured to plot the ACARS data point in addition to the data points that had been maintained in the filtered list. This additional position information may be included for the benefit of the end user.

When an ACARS data point is plotted in addition to the data points that have been maintained in the filtered list, the ACARS data point is preferably not smoothed with respect to the filtered list of data points and instead is simply plotted alongside the smoothed aircraft position information if the ACARS data point does not sit on the flight curve of the smoothed aircraft position information.

In this manner, the apparatus 22 combines and processes various data sets in order to provide users with an enhanced capability to monitor and accurately track one or more aircraft 12 with a visual representation being overlaid onto a geographical map for ease of use. The apparatus 22 provides airline ground staff with a greater visibility of the current status of aircraft 12 and allows any disruption to the flight schedule, for example disruption due to holding or re-routing an aircraft, to be identified quickly and centrally.

Additional aircraft position information may also be combined with the aggregated aircraft position information; for example, radar aircraft position data or Eurocontrol 4-D Trajectory data may be collected at a fourth receiver 38 and included in the aggregated aircraft position data that is filtered, processed and smoothed by the processor 34 in order to produce the smoothed aircraft position information data.

In further examples, additional data sets may be presented as additional layers to be overlaid on the same electronic geographical mapping data as the aircraft position information. These data sets may comprise weather data received at a fifth receiver 40 or flight plan data corresponding to the aircraft 12 that is received at a sixth receiver 42 and may also be updated periodically.

Furthermore, the aircraft position information monitored may be collected and saved as historic data in a data store 44 for future analysis in order to assess and improve aircraft operational efficiency.

Figure 3:
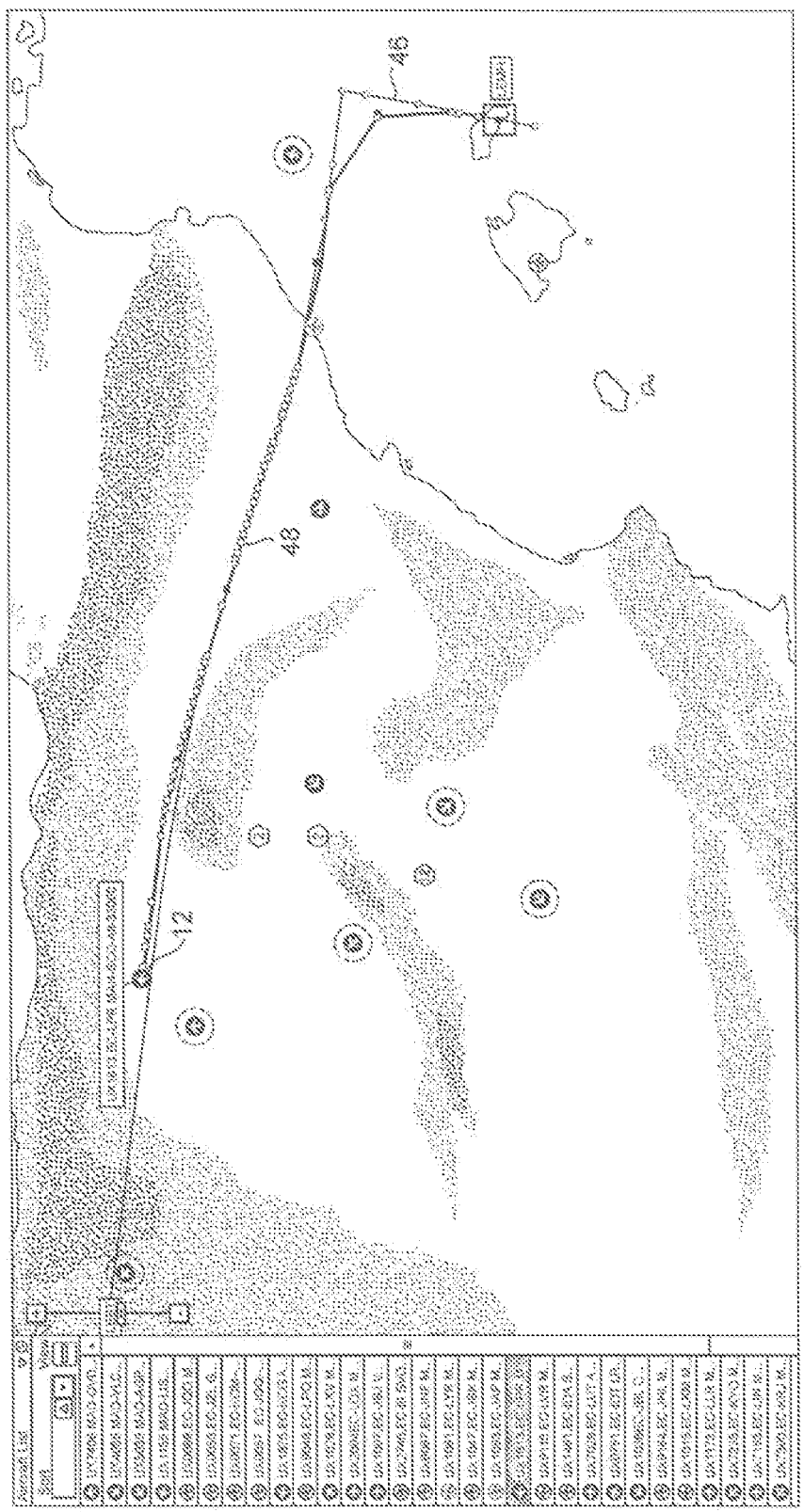
FIG. 3 is a screen shot of the geographical mapping data overlaid with a flight plan and a plot of the smoothed aircraft position information for a given aircraft.

With reference to FIG. 3, example electronic geographical mapping data is depicted overlaid with flight plan data 46 corresponding to an aircraft 12 as well as live aircraft position information 48. As can be seen from the position information plotted in FIG. 3, the ACARS aircraft position information (shown as black squares) is significantly less regular than the ADS-B aircraft position information (shown as white squares). Flight plan waypoints are shown as white circles.

The aircraft position information may be stored temporarily in an output buffer or a data store in order to allow a record of the aircraft's actual flight path to be output by the apparatus. This can then be viewed and optionally compared with the original flight plan. Furthermore, this data may be stored in a permanent data store in order to make the aircraft position information available for further analysis at a later time. This analysis can enable aircraft operators to determine any inefficiencies that have occurred in their past operations such that they can be taken into consideration and used to optimise future operations.

The end user will preferably be able to zoom and pan around the geographical mapping data in real time, which means dynamically determining which subsets of objects are (e.g. aircraft and airports) visible and, in the worst case, displaying all objects on screen simultaneously. Furthermore, in order to be able to display and update both the enormous numbers of dynamic and static objects in an internet browser window, mechanisms (such as algorithms) may be implemented to manage the dynamic data and avoid browsers fetching data that had not changed since the last transaction. This can be achieved by only pushing aircraft data to browsers for update if the aircraft data has changed since the last update.

For static objects (such as airport location data, Flight Information Regions or coverage regions), the space can be partitioned into a number of tiles and objects are partitioned on a tile server for display. This allows static objects to be grouped as a single tile object that can be loaded and will remain valid for a sustained period of time because the information regarding these objects rarely changes. One problem was that the geographical mapping data can be viewed at different zoom levels and accordingly the number of tiles across all zoom levels added up exponentially. Thus the number of tiles being managed is preferably reduced by only managing those tiles with useful information.

According to a second aspect of the invention, and with reference to FIG. 5, a computerised method may be provided comprising receiving first aircraft position information (in the form of ACARS messages containing position information) at a first receiver over a digital data link from a first radio frequency source 50, receiving second aircraft position information (in the form of ADS-B broadcasts) at a second receiver from a second radio frequency source 52 and receiving electronic geographical mapping data 54 at a third receiver.

The first and second aircraft position information is received from respective radio frequency sources located onboard the aircraft and via one or more ground stations. The first and second aircraft position information is then received at a buffer to be buffered and then filtered 56 to limit the number of aircraft position information data points processed within each time period and produce filtered aircraft position information. The filtered aircraft position information is then further processed 58 to produce smoothed aircraft position information, which can then be output 60 from the processor such that it can be overlaid onto the electronic geographical mapping data.

Figure 5A:
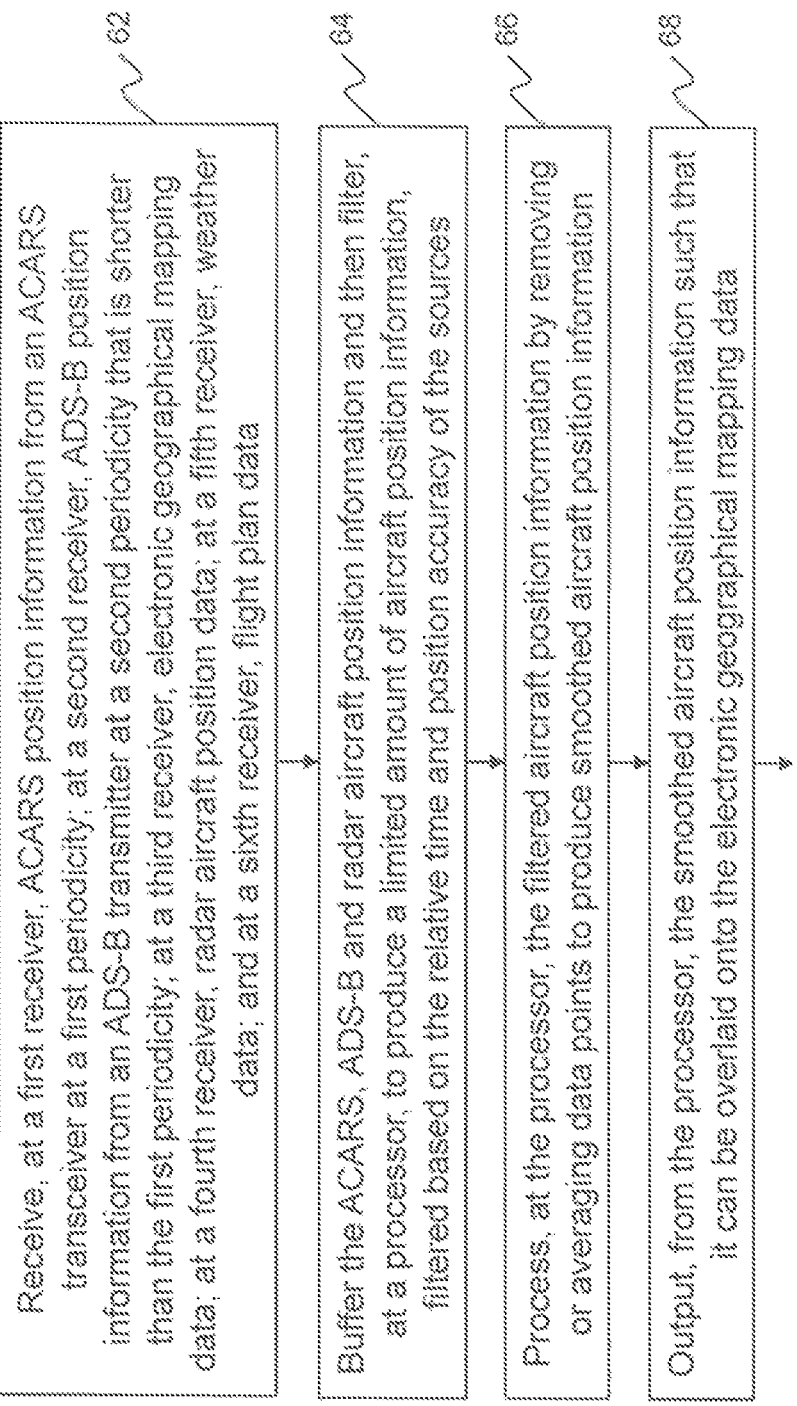
FIGS. 5a and 5b form a flow diagram showing the steps performed by another embodiment of the invention.
Figure 5B:
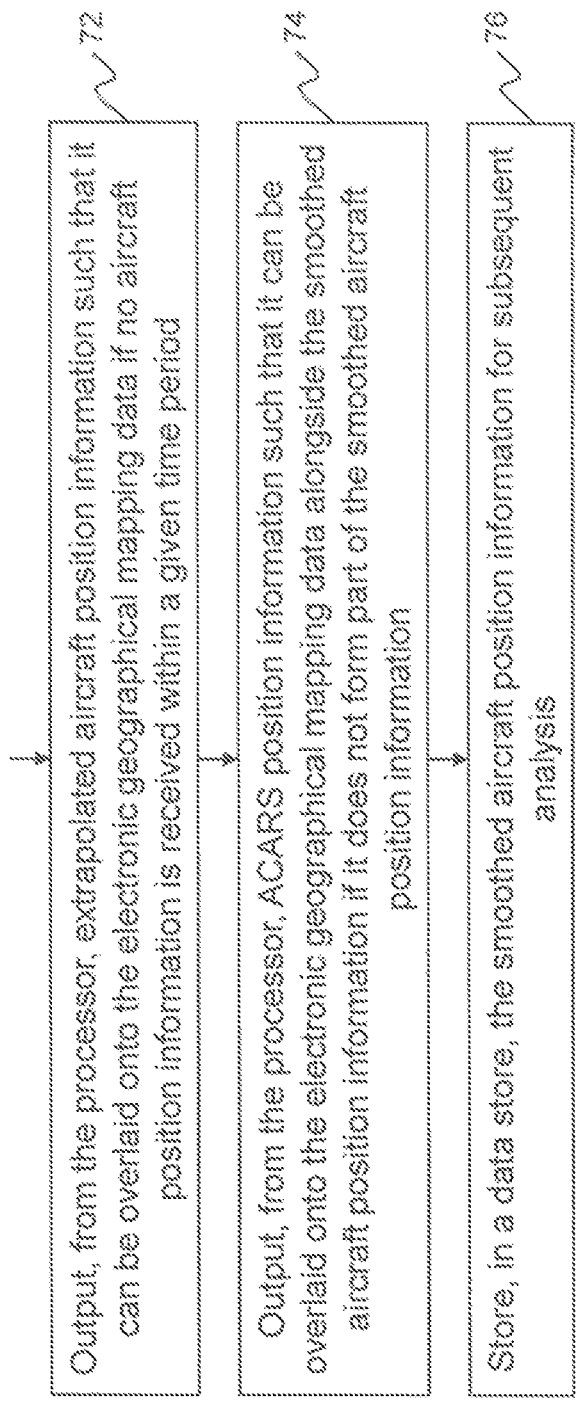

In another embodiment of the second aspect of the invention, and with reference to FIGS. 5a and 5b, a computerised method may be provided comprising receiving 62, at a first receiver, ACARS position information from an ACARS transceiver at a first periodicity; at a second receiver, ADS-B position information from an ADS-B transmitter at a second periodicity that is shorter than the first periodicity; at a third receiver, electronic geographical mapping data; at a fourth receiver, radar aircraft position data; at a fifth receiver, weather data; and at a sixth receiver, flight plan data. This embodiment receives a number of additional data types from various sources; as will be appreciated by the skilled person, intermediate embodiments may include receiving only some of these additional data types.

The computerised method may then buffer 64 the ACARS, ADS-B and radar aircraft position information and then filter, at a processor, to produce a limited amount of aircraft position information, filtered based on the relative time and position accuracy of the sources. This filtered aircraft position information may then be further processed 66 at the processor to produce smoothed aircraft position information, for example by removing erroneous data points or averaging data points.

Once the data has been processed, the smoothed aircraft position information may be output 68 such that it can be overlaid onto the electronic geographical mapping data.

In this embodiment, the processor can be configured to output 72 extrapolated aircraft position information if no aircraft position information is received within a given time period. This extrapolated aircraft position information is preferably output such that it can be overlaid onto the electronic geographical mapping data.

Furthermore, the computerised method may also cause the processor to output ACARS position information such that it can be overlaid onto the electronic geographical mapping data alongside the smoothed aircraft position information even if it does not form part of the smoothed aircraft position information. This means that the ACARS position information can be plotted on the electronic geographical mapping data even when the ACARS aircraft position information has been filtered out by the processor in favour of more accurate aircraft position information. This provides additional position information that is desirable by the end user.

When an ACARS data point is plotted in addition to the data points that have been maintained in the filtered list, the computerised method is preferably arranged not to smooth the ACARS data point with respect to the filtered list of data points. Instead, the ACARS data point is preferably simply plotted alongside the smoothed aircraft position information in its recorded position, even if this means that the ACARS data point does not sit on the flight curve shown by the smoothed aircraft position information.

Preferably, the computerised method also causes 76 the smoothed aircraft position information to be stored in a data store for subsequent analysis.

The flowcharts of FIGS. 4, 5a and 5b illustrate the operation of an example implementation of the apparatus, computerised method and computer program products according to an embodiment of the present invention. Each block in the flowchart may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, the processed associated with two blocks may be carried out simultaneously or, depending on the functionality, in the reverse order. Each block in the flowchart may be implemented in software, hardware or a combination of software and hardware.

Embodiments of the invention provide a computerised method and apparatus for monitoring an aircraft that delivers highly accurate and dynamic aggregate aircraft position information that has the ability to track flight deviations and weather patterns in order to support the corresponding decision making processes of the aircraft operator with an increased visibility of the current aircraft location.

Figure 6:
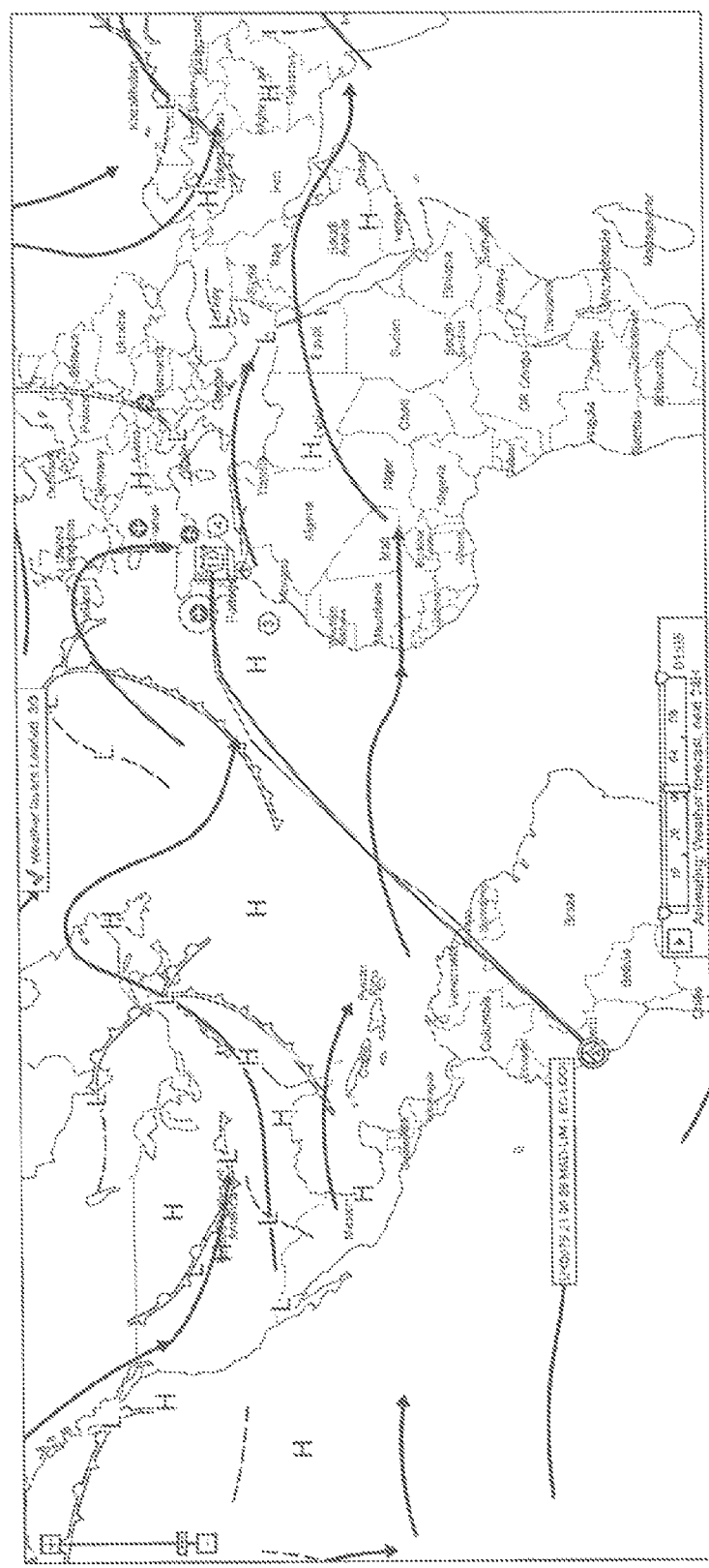
FIG. 6 is a screen shot of the geographical mapping data overlaid with weather data in addition to a flight plan and a plot of the smoothed aircraft position information for a given aircraft.

FIG. 6 shows an example of mapping data including aircraft position information being overlaid with weather data. The weather data may comprise current weather observations (sometimes referred to as a nowcast) and weather forecasts relating to fronts, pressure systems, jetstreams, tropopause boundaries, lighting density, icing conditions, turbulence, thunderstorms and other Significant Meteorological Information (SIGMETs).

Figure 7A:
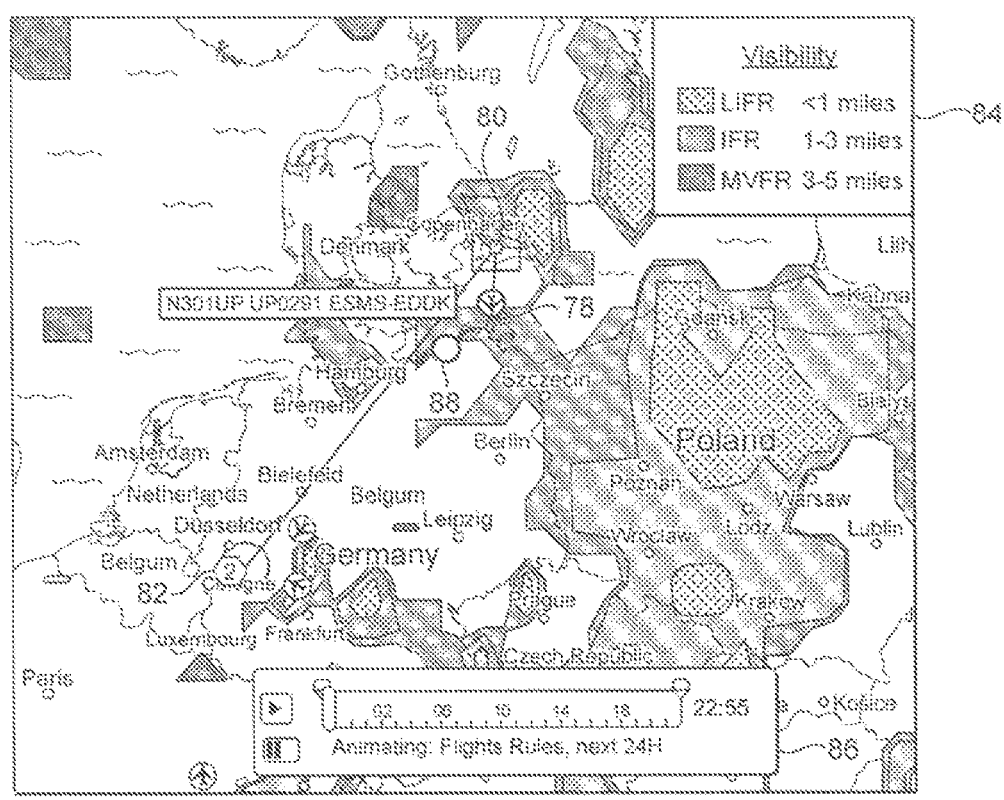
FIGS. 7a to 7c are a series of screenshots showing a progression in time of forecast weather data combined with an estimated flight position overlaid on geographical mapping data.
Figure 7B:
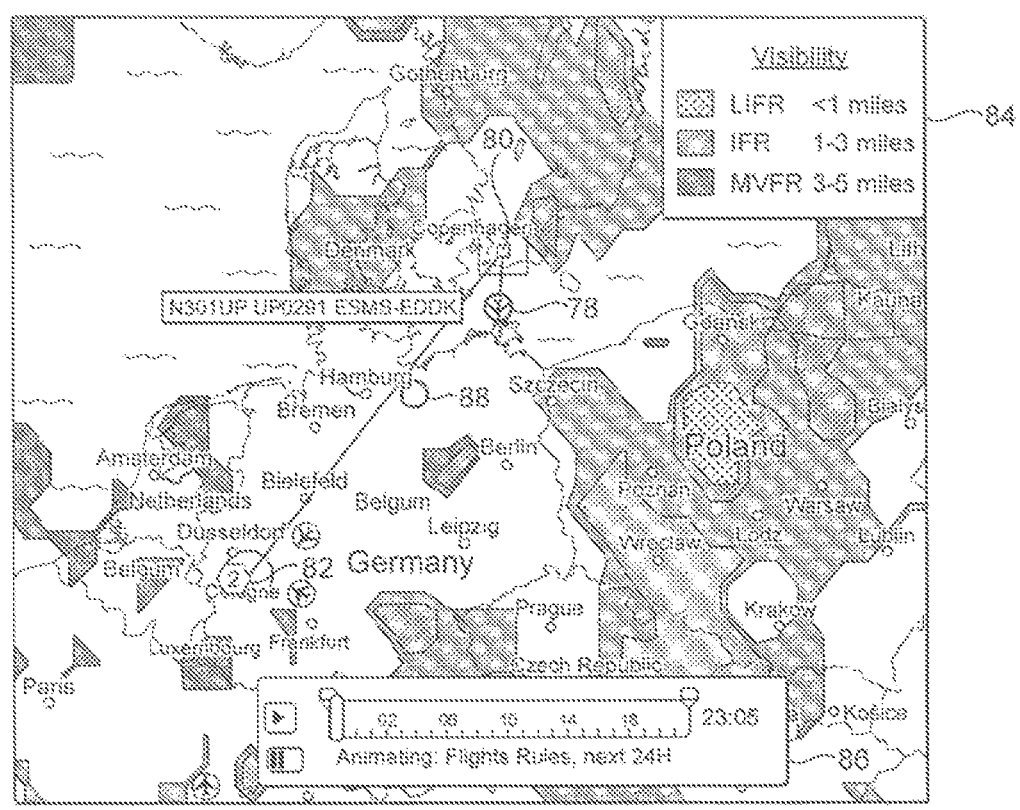
Figure 7C:
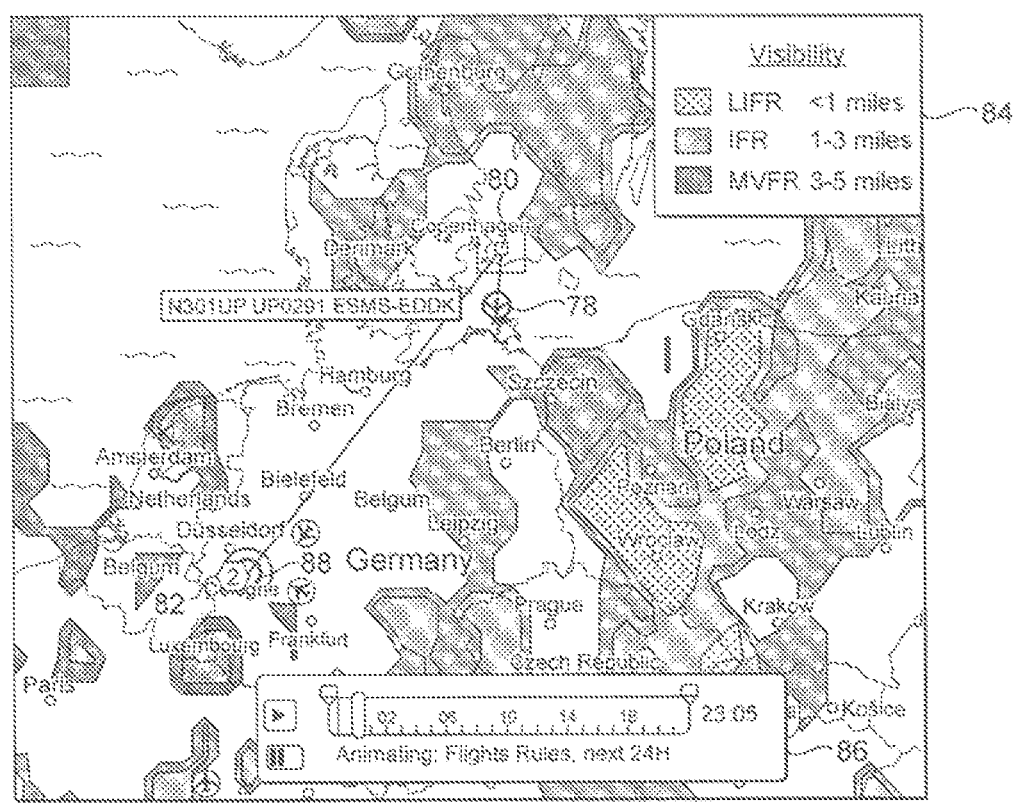

As shown in FIGS. 7a to 7c, the forecasted weather data may be animated on the mapping data alongside the currently estimated flight path in order to enable users to more accurately analyse and identify any potential weather issues that might impact an aircraft based on its planned routing and the current position of the aircraft.

Some time-bound layers, such as observed satellite images, radar or forecasted turbulences, are best represented as animating over time.

FIG. 7a shows a current aircraft position icon 78 of an aircraft that has taken off from a first airport 80 and is due to land at a second airport 82. The forecasted weather data has been overlaid on the mapping data and a legend 84 has optionally been included to enable the user to interpret the weather data. The forecast weather data may be animated by pressing play on the time bar window 86 at the bottom of FIG. 7a. The time bar window 86 is the controller for the display of the animated weather layers, which can either be played or paused and positioned manually. FIGS. 7b and 7c then show the progression of the forecast weather pattern over time as illustrated by the changing time represented on the right hand side of the time bar window 86 and the movement of the time bar.

Since these animations represent the weather patterns forecast for the future, while the current aircraft position icon 78 represents the current position of an aircraft, an estimated aircraft position icon 88 has been included in the animation in order identify where the aircraft is estimated to be at the time that is selected by the time bar and being displayed with respect to the forecasted weather. This allows the user to easily determine the impact that the moving weather pattern will have on the aircraft's flight.

This estimated flight path may be based on an extrapolation from the current position, speed and trajectory of the aircraft on a great-circle trajectory (straightest line around the Earth) between the aircraft's actual position and the second airport 82. Alternatively, if flight plan data is available then the estimated flight path may be estimated based on the original flight plan, taking into account the planned waypoint information included in the flight plan data. For example, the aircraft operator may be able to determine that a given aircraft will need to be diverted from its planned route, thus allow the aircraft operator to consider any knock on effects that this diversion may have ahead of time.

Figure 8A:
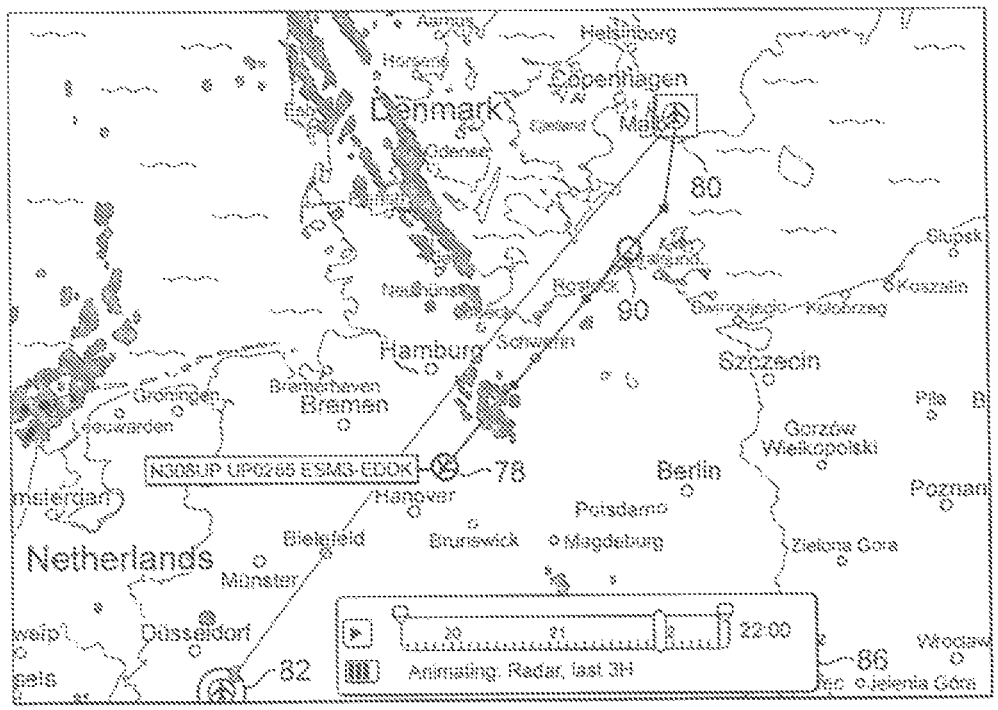
FIGS. 8a to 8c are a series of screenshots showing a progression in time of observed weather data combined with the observed flight position overlaid on geographical mapping data.
Figure 8B:
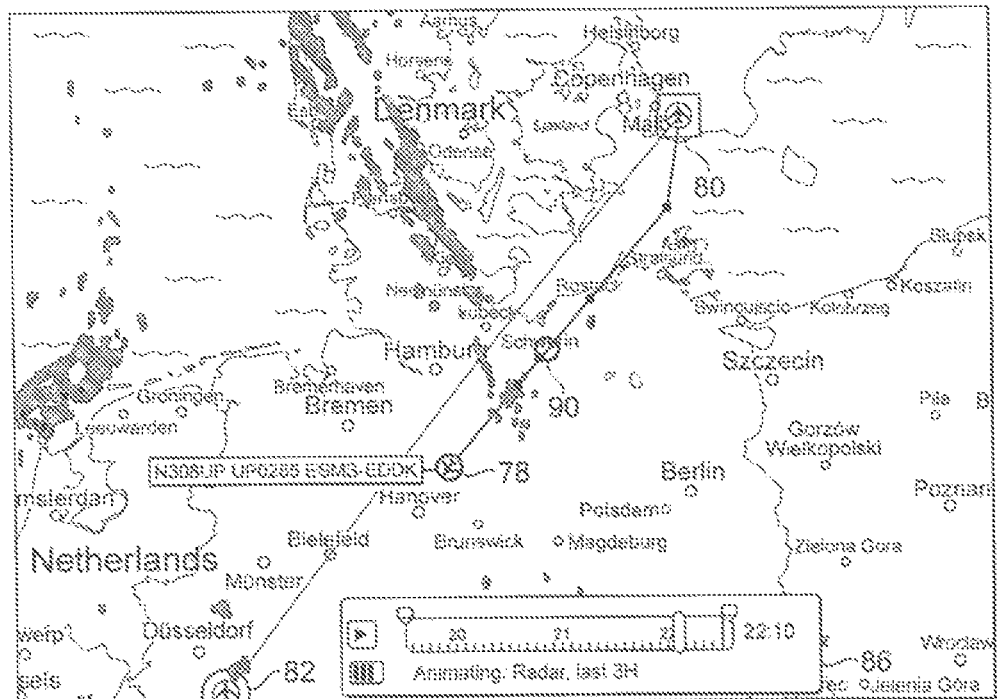
Figure 8C:
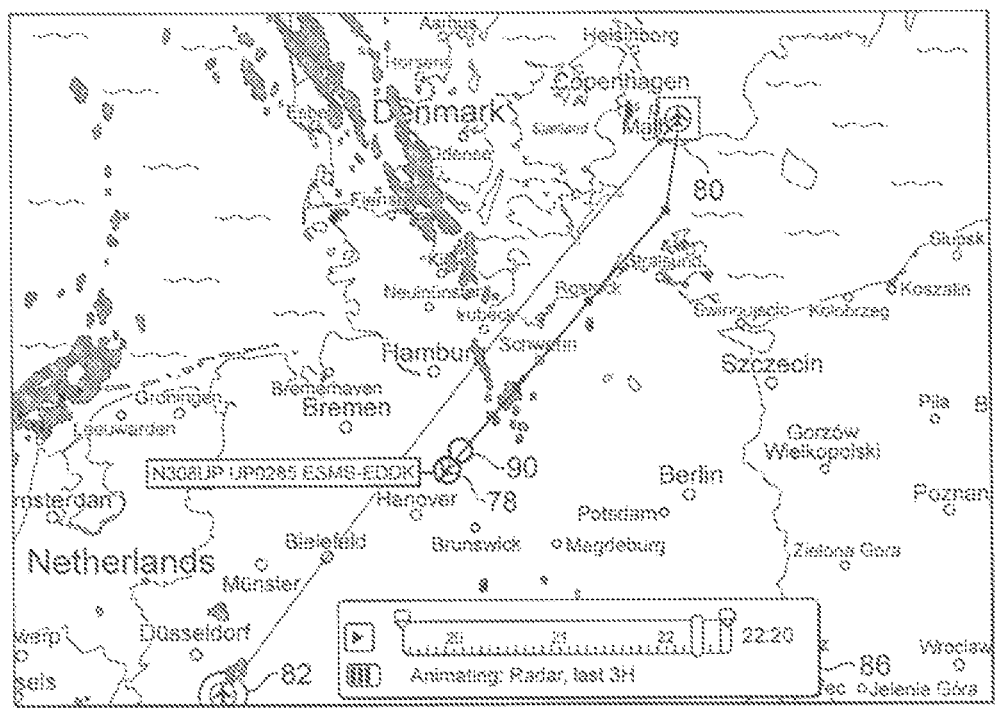

A similar principle may be used with weather data the represents observed weather patterns, i.e. weather that has already occurred. As can be seen from FIGS. 8a to 8c, the estimated aircraft position icon 88 has been replaced with a historic aircraft position icon 90 that indicates where the aircraft was at the time indicated in the time bar window 86. This historic aircraft position icon 90 may represent an interpolation between two observed aircraft positions.

However, the current aircraft position icon 78 is preferably always displayed and maintained in the aircraft's current location so that the aircraft's current location can always be identified easily, quickly and without confusion from any animated past or future positions.

The invention claimed is:

1. An apparatus for monitoring the position of one or more aircraft, comprising:
   a first receiver device that receives first aircraft position information, over a digital data link, from a first radio frequency source located onboard the aircraft at a first periodicity, via one or more ground stations;
   a second receiver device that receives second aircraft position information broadcasted from a second radio frequency source located onboard the aircraft at a second periodicity, via one or more ground stations;
   a buffer that receives the first and second aircraft position information from the first and second receiver devices respectively; and
   a processor that:
      receives and filters the buffered first and second aircraft position information based on relative positional accuracy and relative temporal accuracy of the first and second radio frequency sources such that a quantity of filtered position information data for a given aircraft is within a given limit for a given time period,
      smoothes the filtered aircraft position information, and
      outputs the smoothed aircraft position information such that it can be overlaid onto electronic geographical mapping data.

2. An apparatus according to claim 1, wherein the given limit is at least a most accurate data point within the buffered first and second aircraft position information and the given time period is one minute.

3. An apparatus according to claim 1, wherein the processor smoothes the filtered aircraft position information by removing erroneous data points or by averaging data points.

4. An apparatus according to claim 1, wherein the second period is shorter than the first periodicity.

5. An apparatus according to claim 1, wherein the first radio frequency source comprises an Aircraft Communications Addressing and Reporting System (ACARS) transceiver and the first aircraft position information is ACARS aircraft position information.

6. An apparatus according to claim 5, wherein the second radio frequency source comprises an Automatic Dependent Surveillance-Broadcast (ADS-B) transmitter and the second aircraft position information is ADS-B aircraft position information.

7. An apparatus according to claim 1, wherein the one or more ground stations may comprise a VHF ground station, a HF ground station or a satellite ground station.

8. An apparatus according to claim 1, further comprising a third receiver that receives radar aircraft position data, wherein the processor filters the radar aircraft position data in combination with the first and second aircraft position information such that the quantity of filtered position information data is within the given limit for the given time period.

9. An apparatus according to claim 1, further comprising a fourth receiver that receives weather data, wherein the processor outputs the weather data such that it can be overlaid onto the electronic geographical mapping data and smoothed aircraft position information.

10. An apparatus according to claim 1, further comprising a fifth receiver that receives flight plan data corresponding to the aircraft, wherein the processor outputs the flight plan data such that it can be overlaid onto the electronic geographical mapping data and smoothed aircraft position information.

11. An apparatus according to claim 1, wherein the buffer is a circular buffer and wherein the processor filters the first and second aircraft position information with a sampling filter for filtering and sorting the aircraft position information to be included in a reduced set of aircraft position information, the sampling filter optionally being based on temporal and precision criteria.

12. An apparatus according to claim 1, wherein the processor identifies aircraft position data relating to a given aircraft by a data matching engine.

13. An apparatus according to claim 1, further comprising a data store that stores the smoothed aircraft position information for subsequent analysis.

14. An apparatus according to claim 1, wherein the processor outputs extrapolated aircraft position information such that it can be overlaid onto the electronic geographical mapping data if no aircraft position information is received at the processor for a given aircraft within a given time period.

15. An apparatus according to claim 6, wherein the processor outputs ACARS aircraft position information such that it can be overlaid onto the electronic geographical mapping data alongside the smoothed aircraft position information if the ACARS aircraft position information does not form part of the smoothed aircraft position information.

16. A computerised method for monitoring the position of one or more aircraft, comprising:
receiving, at a first receiver device, first aircraft position information, over a digital data link, from a first radio frequency source located onboard the aircraft at a first periodicity, via one or more ground stations;
receiving, at a second receiver device, second aircraft position information broadcasted from a second radio frequency source located onboard the aircraft at a second periodicity, via one or more ground stations;
receiving, at a buffer, the received first and second aircraft position information;
filtering, at a processor, the buffered first and second aircraft position information based on relative positional accuracy and relative temporal accuracy of the first and second radio frequency sources such that a quantity of filtered position information data for a given aircraft is within a given limit for a given time period;
smoothing, at the processor, the filtered aircraft position information to produce smoothed aircraft position information; and
outputting, from the processor, the smoothed aircraft position information such that it can be overlaid onto electronic geographical mapping data.

17. A computerised method according to claim 16, wherein the given limit is at least a most accurate data point within the buffered first and second aircraft position information and the given time period is one minute.

18. A computerised method according to claim 16, wherein smoothing the filter aircraft position information comprises removing erroneous data points or averaging data points.

19. A computerised method according to claim 16, wherein the second periodicity is shorter than the first periodicity.

20. A computerised method according to claim 16, wherein the first aircraft position information is received, at the first receiver, from an Aircraft Communications Addressing and Reporting System (ACARS) transceiver and the first aircraft position information is ACARS aircraft position information.

21. A computerised method according to claim 20, wherein the second aircraft position information is received, at the second receiver, from an Automatic Dependent Surveillance-Broadcast (ADS-B) transmitter and the second aircraft position information is ADS-B aircraft position information.

22. A computerised method according to claim 16, wherein the first and second aircraft position information may be received via one or more of a VHF ground station, a HF ground station or a satellite ground station.

23. A computerised method according to claim 16, further comprising receiving, at a third receiver, radar aircraft position data and filtering the radar aircraft position data in combination with the first and second aircraft position information such that the quantity of filtered position information data is within the given limit for the given time period.

24. A computerised method according to claim 16, further comprising receiving, at a fourth receiver, weather data and outputting, from the processor, the weather data such that it can be overlaid onto the electronic geographical mapping data.

25. A computerised method according to claim 16, further comprising receiving, at a fifth receiver, flight plan data corresponding to the aircraft and outputting, from the processor, the flight plan data such that it can be overlaid onto the electronic geographical mapping data and smoothed aircraft position information.

26. A computerised method according to claim 16, wherein the buffer is a circular buffer and wherein the processor filtering step comprises using a sampling filter to filter and sort the aircraft position information to be included in a reduced set of aircraft position information, the sampling filter optionally being based on temporal and precision criteria.

27. A computerised method according to claim 16, wherein the method further comprises identifying, at the processor, aircraft position data relating to a given aircraft by a data matching engine.

28. A computerised method according to claim 16, wherein the smoothed aircraft position information is stored, in a data store, for subsequent analysis.

29. A computerised method according to claim 16, wherein the processor further outputs extrapolated aircraft position information such that it can be overlaid onto the electronic geographical mapping data if no aircraft position information is received at the processor for a given aircraft within a given time period.

30. A computerised method according to claim 21, wherein the processor further outputs ACARS aircraft position information such that it can be overlaid onto the electronic geographical mapping data alongside the smoothed aircraft position information if the ACARS aircraft position information does not form part of the smoothed aircraft position information.

31. An apparatus for monitoring the position of an aircraft, comprising:
   a first receiver device that receives aircraft position information corresponding to the aircraft;
   a second receiver device that receives a number of frames of weather data, each frame corresponding to a given moment in time; and
   a processor that:
      receives the aircraft position information and the weather data,
      derives aircraft position data for the aircraft corresponding to each moment in time represented by the frames of weather data,
      outputs the aircraft position information, the aircraft position data and the weather data such that it can be overlaid onto electronic geographical mapping data, and
      estimates, for frames of weather data corresponding to a future moment in time, the aircraft position data based on an extrapolation from a position and trajectory of the aircraft identified by the aircraft position information or based on an interpolation between a position of the aircraft identified by the aircraft position information and a flight plan corresponding to the aircraft received at the processor.

32. An apparatus according to claim 6, wherein the relative positional accuracy of the ADS-B aircraft position information exceeds the relative positional accuracy of the ACARS aircraft position information.

33. A computerised method according to claim 21, wherein the relative positional accuracy of the ADS-B aircraft position information exceeds the relative positional accuracy of the ACARS aircraft position information.

\* \* \* \* \*